US011704721B2

(12) United States Patent
Nakamura et al.

(10) Patent No.: US 11,704,721 B2
(45) Date of Patent: Jul. 18, 2023

(54) INFORMATION PROCESSING DEVICE, INFORMATION PROCESSING METHOD, PAYMENT SYSTEM AND PROGRAM

(71) Applicant: Rakuten Group, Inc., Tokyo (JP)

(72) Inventors: Koichi Nakamura, Tokyo (JP); Takeshi Yoshimura, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 64 days.

(21) Appl. No.: 17/044,631

(22) PCT Filed: Dec. 27, 2018

(86) PCT No.: PCT/JP2018/048344
§ 371 (c)(1),
(2) Date: Oct. 1, 2020

(87) PCT Pub. No.: WO2020/136847
PCT Pub. Date: Jul. 2, 2020

(65) Prior Publication Data
US 2021/0166295 A1    Jun. 3, 2021

(51) Int. Cl.
*G06Q 30/00* (2023.01)
*G06Q 30/0601* (2023.01)
(Continued)

(52) U.S. Cl.
CPC ......... *G06Q 30/0635* (2013.01); *G06K 15/40* (2013.01); *G06Q 20/407* (2013.01)

(58) Field of Classification Search
CPC .................................................... G06Q 30/00
See application file for complete search history.

(56) References Cited

U.S. PATENT DOCUMENTS 9,240,006 B2 * 1/2016 White ................ G06Q 20/3276
9,652,773 B1 * 5/2017 Dublin, III ............ G02F 1/1336
(Continued)

FOREIGN PATENT DOCUMENTS

CN    108182628 A    6/2018
CN    108629590 A    10/2018
(Continued)

OTHER PUBLICATIONS

Adivarrkar, Provin, "Food Ordering System for Restaurants Using Android", IJREAM, dated Mar. 2016. (Year: 2016).*
(Continued)

*Primary Examiner* — Mark A Fadok
(74) *Attorney, Agent, or Firm* — Sughrue Mion, PLLC

(57) ABSTRACT

An information processing device obtains order identification information capable of identifying an order placed by an order-placing person, transmits, as payment information, the order identification information, causes a printing process of a print medium to be executed, the print medium being capable of identifying the order identification information and gives, to another information processing device when an additional order placed by the order-placing person is received, an invalidation command which invalidates the order identification information in such a way that a payment with respect to the order identification information on an order not paid yet and placed by the same order-placing person is disabled.

2 Claims, 23 Drawing Sheets

(51) Int. Cl.
  *G06K 15/00* (2006.01)
  *G06Q 20/40* (2012.01)

(56) References Cited

U.S. PATENT DOCUMENTS

| | | | |
|---|---|---|---|
| 10,255,645 B1* | 4/2019 | Christensen | G06Q 20/405 |
| 10,360,648 B1* | 7/2019 | Rocklin | G07C 11/00 |
| 10,586,293 B1* | 3/2020 | Christensen | G06Q 20/14 |
| 10,762,484 B1* | 9/2020 | Wilson | G06Q 20/204 |
| 11,244,299 B1* | 2/2022 | Pittack | G06Q 20/3224 |
| 11,276,128 B2* | 3/2022 | Cloin | G06Q 20/32 |
| 2004/0054592 A1* | 3/2004 | Hernblad | G06Q 20/322 |
| | | | 705/15 |
| 2005/0183601 A1 | 8/2005 | Ashizaki | |
| 2009/0063274 A1* | 3/2009 | Dublin, III | G06Q 30/0245 |
| | | | 705/14.1 |
| 2014/0058902 A1* | 2/2014 | Taylor | G06Q 30/06 |
| | | | 705/26.81 |
| 2014/0324606 A1* | 10/2014 | Fortuna | G06Q 20/3276 |
| | | | 705/15 |
| 2015/0032567 A1* | 1/2015 | Bhatia | G06Q 20/14 |
| | | | 705/26.8 |
| 2015/0039450 A1* | 2/2015 | Hernblad | G06Q 20/322 |
| | | | 705/15 |
| 2015/0134441 A1* | 5/2015 | Balar | G06Q 20/145 |
| | | | 705/21 |
| 2015/0149307 A1* | 5/2015 | Thukral | G06Q 30/0635 |
| | | | 705/15 |
| 2015/0193844 A1* | 7/2015 | Logan | G06Q 50/12 |
| | | | 705/15 |
| 2015/0310408 A1* | 10/2015 | Anderson | G06Q 10/02 |
| | | | 705/39 |
| 2015/0348144 A1* | 12/2015 | Zamer | G06Q 30/04 |
| | | | 705/40 |
| 2016/0034864 A1* | 2/2016 | Macrae | G06Q 20/3276 |
| | | | 705/39 |
| 2016/0048775 A1* | 2/2016 | Zibell | G06Q 10/02 |
| | | | 705/5 |
| 2016/0055598 A1* | 2/2016 | Ramini | G06Q 50/12 |
| | | | 705/15 |
| 2016/0063473 A1* | 3/2016 | Lee | G06Q 20/326 |
| | | | 705/15 |
| 2016/0203470 A1 | 7/2016 | Bae | |
| 2016/0275576 A1* | 9/2016 | Logan | H04W 76/10 |
| 2017/0061523 A1* | 3/2017 | Zambo | G06Q 30/0633 |
| 2017/0109843 A1* | 4/2017 | Berg | G06Q 50/12 |
| 2018/0268381 A1 | 9/2018 | Kamamoto | |

FOREIGN PATENT DOCUMENTS

| | | |
|---|---|---|
| JP | 2012-094058 A | 5/2012 |
| JP | 2016-533584 A | 10/2016 |
| JP | 2018-151757 A | 9/2018 |
| TW | 500964 B | 9/2002 |

OTHER PUBLICATIONS

International Search report of PCT/JP2018/048344 dated Mar. 12, 2019 [PCT/ISA/210].

Written Opinion of PCT/JP2018/048344 dated Mar. 12, 2019 [PCT/ISA/237].

Office Action dated Mar. 29, 2023 in Chinese Application No. 201880051403.5.

* cited by examiner

FIG. 9A

| RECORD NO. | SHOP CODE | TABLE CODE | GUEST CODE | NUMBER OF PLACED ORDERS | DETAILS OF ORDER | TOTAL AMOUNT OF MONEY | ALREADY-PAID FLAG |
|---|---|---|---|---|---|---|---|
| 000001 | 001 | 013 | 002 | 001 | (024,2), (031,1), (019,1), ... | 2460 | False |

- SHOP CODE, TABLE CODE, GUEST CODE → ORDER-PLACING PERSON IDENTIFICATION INFORMATION
- RECORD NO. ... NUMBER OF PLACED ORDERS → ORDER IDENTIFICATION INFORMATION
- In DETAILS OF ORDER: first value = MENU NO., second value = NUMBER OF ITEMS

FIG. 9B

| MENU NO. | UNIT PRICE |
|---|---|
| 001 | 480 |
| ... | ... |
| 019 | 860 |
| ... | ... |
| 024 | 290 |
| ... | ... |
| 031 | 120 |
| ... | ... |

| RECORD NO. | ORDER IDENTIFICATION INFORMATION | AMOUNT INFORMATION | VALIDATION FLAG | ALREADY-PAID FLAG |
|---|---|---|---|---|
| 001 | 001013002001 | 2460 | True | False |

INFORMATION PROCESSING DEVICE, INFORMATION PROCESSING METHOD, PAYMENT SYSTEM AND PROGRAM

CROSS REFERENCE TO RELATED APPLICATIONS

This application is a National Stage of International Application No. PCT/JP2018/048344 filed on Dec. 27, 2018, the disclosure of which is incorporated herein in its entirety by reference.

TECHNICAL FIELD

The present disclosure relates to a technical field involving an information processing device, an information processing method, a payment system and a program which receive information on an order placed by a user and which execute various kinds of processes thereon.

BACKGROUND ART

When, for example, a meal is taken at a shop, there is a case such that a payment-procedure process is delayed because of a concentration of payment-procedure timings by multiple guests who are visiting such a shop, and thus many guests stand in line. This may cause the guests who have finished the meal to waste a time.

Following Patent Literature 1 discloses that, in view of such a problem, a self-ordering terminal is caused to read menu identification information (a menu code) from a menu book to place an order, and a payment-procedure device is caused to read a payment-procedure code printed by the self-ordering terminal for making a payment. Moreover, it is also disclosed that respective devices for order placement or for payment are combined by the necessary number and installed as appropriate, thereby dispersing persons who are in line and waiting for payment procedure.

CITATION LIST

Patent Literatures

Patent Literature 1: JP 2012-94058 A

SUMMARY OF INVENTION

Technical Problem

Meanwhile, there is a possibility such that an unexpected situation that cannot be anticipated may occur when a guest who is visiting a shop is caused to operate the payment-procedure device. For example, it is expected that an improper operation is made because the guest is not familiar with the payment-procedure device, and an improper payment-procedure process is executed. In such a case, a correction operation that is originally unnecessary if a shop assistance executes the payment process becomes necessary such that the guest calls the shop assistance to start over the payment-procedure operation. This may increase a work load on the shop assistance.

Hence, an objective of the present disclosure is to provide an environment that enables an appropriate payment-procedure process while reducing a work load on a shop assistance involved in the payment-procedure process.

Solution to Problem

An information processing device according to the present disclosure includes: an information obtaining unit that obtains order identification information capable of identifying an order placed by an order-placing person; a transmitting unit that transmits, as payment information, the order identification information; a printing control unit that causes a printing process of a print medium to be executed, the print medium being capable of identifying the order identification information; and an invalidation commanding unit that gives, to another information processing device when an additional order placed by the order-placing person is received, an invalidation command which invalidates the order identification information in such a way that a payment with respect to the order identification information on an order not paid yet and placed by the same order-placing person is disabled.

This causes only the latest payment information to be validated when there are plural pieces of the payment information not paid yet by the same order-placing person.

In the above-described information processing device, the order identification information may contain order-placing person identification information that distinguishes the order-placing person.

When the order identification information contains the information that can identify the order-placing person, a determination is enabled on whether or not it is the order by the same order-placing person simply by analyzing order identification information.

In the above-described information processing device, the order-placing person identification information may contain information capable of identifying a shop at which the order is received.

When the information that can identify a customer also contains the information that can identify the shop, customer identifying information becomes information that is different shop by shop.

In the above-described information processing device, the printing process may be a process of printing, on the print medium, code information capable of identifying the order identification information.

This enables utilization of one-dimensional bar code and two-dimensional bar code that are universally prevalent as the code information.

The above-described information processing device may further include a receiving unit that receives, as a payment completion notification, a notification indicating that a payment has been completed from the another information processing device.

By receiving the payment completion notification, a determination on whether or not the order-placing person has paid is enabled.

In the above-described information processing device, the payment information may contain amount information for an amount of money to be paid for the order; and when, after the payment completion notification for the order placed by the order-placing person is received, and the additional order placed by the same order-placing person is received, the transmitting unit may transmit, as the amount information, information on the total amount of money for the additional order which is placed after the payment completion notification is received and which is not paid yet.

That is, the notification from which the amount of money for an order that has been already paid is removed is given to another information processing device (e.g., a payment managing server).

Another information processing device according to the present disclosure includes: a payment information receiving unit that receives, as payment information, order identification information capable of identifying an order placed by an order-placing person; a storing process unit that causes a storing process of the received payment information to be executed; a payment request receiving unit that receives a payment request from an order-placing person terminal utilized by the order-placing person, the payment request containing the order identification information and paying information on the order-placing person; a payment process unit that executes, based on the payment request, a payment process on the payment information; and an invalidation process unit which receives, when an additional order placed by the order-placing person is received, an invalidation command which invalidates the order identification information in such a way that a payment with respect to the order identification information not paid yet and placed by the same order-placing person is disabled, and which invalidates the stored payment information.

Such another information processing device receives the payment information from the foregoing information processing device, and executes the respective processes.

Another information processing device according to the present disclosure may include: a receiving unit that receives, as payment information, order identification information capable of identifying an order placed by an order-placing person; a printing control unit that causes a printing process of a print medium to be executed, the print medium being capable of identifying the order identification information; and an invalidation process unit that executes, when an additional order placed by the order-placing person is received, an invalidation process of invalidating the order identification information in such a way that a payment with respect to the order identification information on an order not paid yet and placed by the same order-placing person is disabled.

A payment system according to the present disclosure includes: an information obtaining unit that obtains order identification information capable of identifying an order placed by an order-placing person; a transmitting unit that transmits, as payment information, the order identification information; a printing control unit that causes a printing process of a print medium to be executed, the print medium being capable of identifying the order identification information; an invalidation commanding unit that gives, to another information processing device when an additional order placed by the order-placing person is received, an invalidation command which invalidates the order identification information in such a way that a payment with respect to the order identification information not paid yet and placed by the same order-placing person is disabled; a payment information receiving unit that receives the payment information; a storing process unit that causes a storing process of the received payment information to be executed; a payment request receiving unit that receives a payment request from an order-placing person terminal utilized by the order-placing person, the payment request containing the order identification information and paying information on the order-placing person; a payment process unit that executes, based on the payment request, a payment process on the payment information; and an invalidation process unit which receives an invalidation command from the invalidation commanding unit, and which invalidates the stored payment information.

Alternatively, a payment system may include: an information obtaining unit that obtains order identification information capable of identifying an order placed by an order-placing person; a transmitting unit that transmits, as payment information, the order identification information; a payment information receiving unit that receives the payment information; a storing process unit that causes a storing process of the received payment information to be executed; a printing control unit that causes a printing process of a print medium to be executed, the print medium being capable of identifying the order identification information; an invalidation process unit that executes, when an additional order placed by the order-placing person is received, an invalidation process of invalidating the order identification information in such a way that a payment with respect to the order identification information not paid yet and placed by the same order-placing person is disabled; a payment request receiving unit that receives a payment request from an order-placing person terminal utilized by the order-placing person, the payment request containing the order identification information and paying information on the order-placing person; and a payment process unit that executes, based on the payment request, a payment process on the payment information.

An information processing method according to the present disclosure is executed by an information processing device, and the method includes: an information obtaining step of obtaining order identification information capable of identifying an order placed by an order-placing person; a transmitting step of transmitting, as payment information, the order identification information; a printing control step of causing a printing process of a print medium to be executed, the print medium being capable of identifying the order identification information; and an invalidation commanding step of giving, to another information processing device when an additional order placed by the order-placing person is received, an invalidation command which invalidates the order identification information in such a way that a payment with respect to the order identification information not paid yet and placed by the same order-placing person is disabled.

This provides an environment in which only the latest payment information is validated when there are plural pieces of payment information not paid yet by the same order-placing person.

A program according to the present disclosure causes a computer to execute: a procedure for reading, from a print medium, order identification information capable of identifying an order; and a procedure for transmitting a payment request that contains paying information to make a payment with respect to the order which is placed after invalidated payment information by an invalidation command and which is not paid yet, and the read order identification information.

This enables a payment under an environment in which only the latest payment information is validated when there are plural pieces of payment information not paid yet by the same order-placing person.

Advantageous Effects of Invention

According to the present disclosure, a work load on a shop assistance involved in the payment-procedure process is reduced with the payment procedure being executed by the order-placing person, and an appropriate payment-procedure process is enabled as only the latest payment information is validated when there are plural pieces of payment information not paid by the same order-placing person.

BRIEF DESCRIPTION OF DRAWINGS

FIGS. 9A and 9B are diagrams for describing the order information, etc., stored in an order DB;

DESCRIPTION OF EMBODIMENTS

Figure 1:
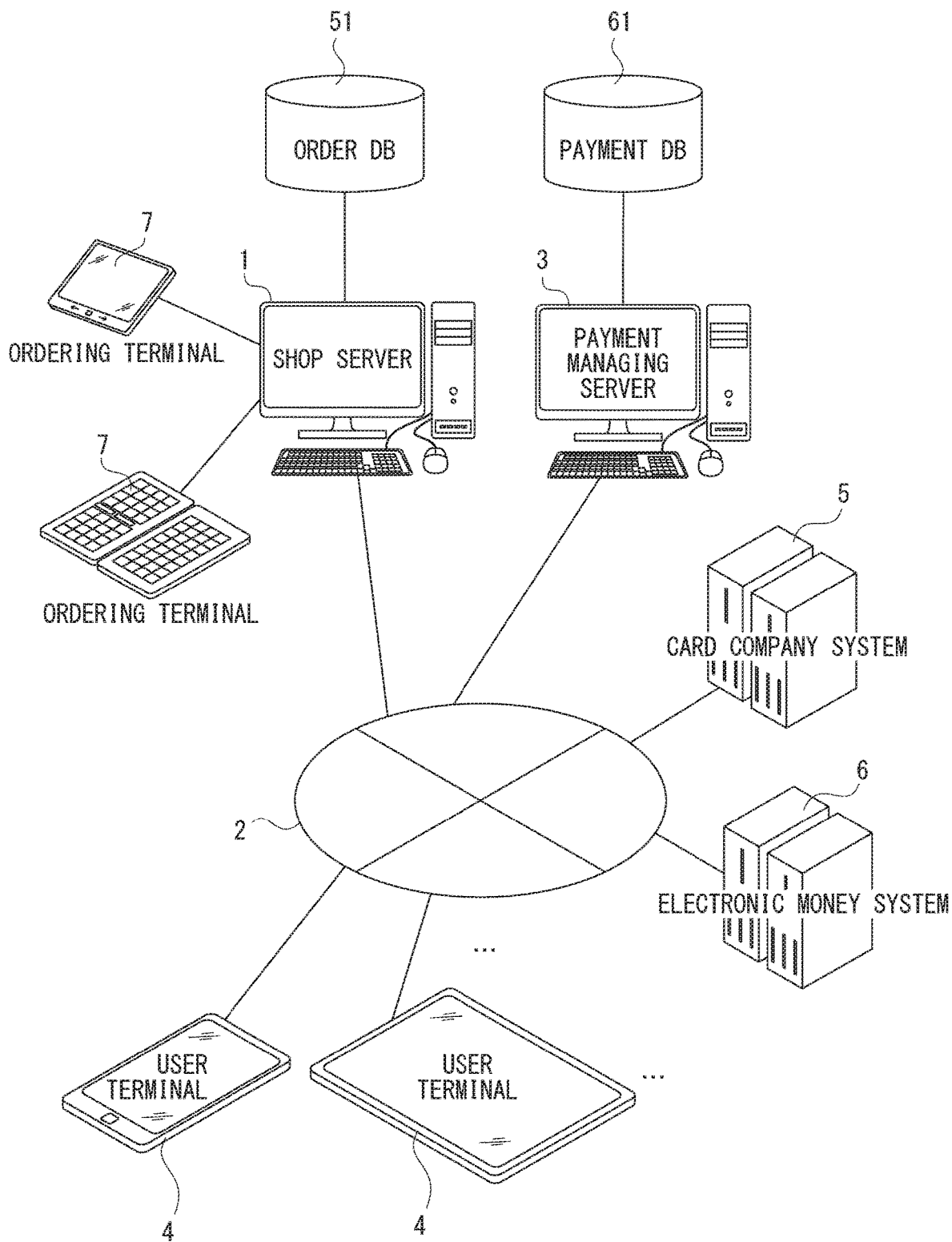
FIG. 1 is a diagram for describing a network that includes a shop server according to an embodiment of the present disclosure.

An example structure of a network system that includes a shop server 1 according to this embodiment will be described with reference to FIG. 1.

<1. System Configuration>

The shop server 1 according to this embodiment is connected to a communication network 2.

The communication network 2 is also connected to a payment managing server 3, a user terminal 4, a card company system 5, and an electronic money system 6, etc.

Respective devices and system are mutually communicable with each other via the communication network 2.

Various example structures for the communication network 2 are assumable. For example, the Internet, an intranet, an extra network, a Local Area Network (LAN), a Community Antenna TeleVision (CATV) communication network, a Virtual Private Network (VPN), a telephone network, a mobile communications network, a satellite communication network, etc., are assumable.

Moreover, various examples for a transmission medium that constitutes all of or a part of the communication network 2 are assumable. For example, wired scheme, such as Institute of Electrical and Electronics Engineers (IEEE) 1394, a Universal Serial Bus (USB), a power line transmission, or a telephone line, or a wireless scheme, such as infrared ray like Infrared Data Association (IrDA), the Bluetooth (registered trademark), 802.11 wireless transmission, a mobile phone network, a satellite connection, or a terrestrial digital network, are available.

The shop server 1 is an information processing device installed at a shop, such as a restaurant or a retail store. The shop server 1 executes a process of receiving an order placed by a guest who is visiting the shop (an order-placing person), a process of informing a kitchen of the order details, and a process of transmitting payment information to the payment managing server 3, etc.

Moreover, an ordering terminal 7 that is an input terminal which enables inputting of an order placed by the order-placing person is also installed at the shop as appropriate in addition to the shop server 1. The number of ordering terminals 7 is set as appropriate in accordance with, for example, a scale of the shop.

The ordering terminal 7 may be a handheld-type that is possessed by a shop assistance who works at the shop, or may be a desktop installation-type that is installed on a table on which a visiting guest eats foods.

Various pieces of information input via the ordering terminal 7 are transmitted to the shop server 1. The ordering terminal 7 enables not only inputting of a new order but also inputting of an additional order.

It is appropriate if the ordering terminal 7 is communicable with at least the shop server 1. Moreover, a communication to the shop server 1 from the ordering terminal 7 may be enabled, but a communication to the ordering terminal 7 from the shop server 1 may be disabled.

The shop server 1 executes various processes based on the information received from the ordering terminal 7. Moreover, the shop server 1 that has received the information on the additional order from the ordering terminal 7 transmits, to the payment managing server 3, the payment information for the additional order, and also transmits, to the payment managing server 3, an invalidation command that invalidates the payment information already transmitted so far.

The shop server 1 includes an order DB 51 that stores the received order information in order to execute each of the above-described processes. The order DB 51 stores, in association with order identification information, menu information and unit price information per an ordered single item, and total amount information on the order, etc.

The payment managing server 3 executes, for example, a process of receiving the payment information from the shop server 1, and storing the received information in a storing unit. Moreover, such a server executes a process of receiving the invalidation command from the shop server 1, and of invalidating the corresponding payment information.

In order to do so, the payment managing server 3 includes a payment DB 61 that stores the received payment information. The payment DB 61 stores the order identification information and the total amount information in association with each other.

The user terminal 4 is an information processing terminal utilized by the order-placing person, and is capable of reading code information (e.g., a one-dimensional bar code or a two-dimensional bar code). Reading of the code information may be enabled by installing a software in the user terminal 4.

Moreover, the user terminal 4 is capable of transmitting a payment request to the payment managing server 3 based on the read code information. In this case, a desired payment method may be specified from multiple payment methods which are provided, such as a payment by credit card and a payment by electronic money.

A user terminal 4 is, for example, a personal computer (PC), a feature phone or a Personal Digital Assistants (PDA), or a smart device, such as a smart phone, or a tablet terminal, etc., with a communication function.

When the order-placing person (the user) specifies a payment by credit card, the card company system 5 receives, from the payment managing server 3, various necessary information to make the payment by credit card, and executes a payment process by credit card.

For example, a process of determining whether the expiration date of a specified credit card is valid, a process of determining whether the specified credit card is not registered in a prohibition list, a process of determining whether the usage amount does not exceed the amount limit, etc., are executed. Moreover, when a determination is made that the specified credit card is available, a process of ensuring the usage amount at this time is executed.

In order to do so, the card company system 5 includes a database (DataBase, referred to as a "DB" below) that stores user information (information that associates personal information, such as the name of the user and the age thereof, with card information), a DB for authorization (a so-called "authori") and a DB that stores a use record of the credit card, etc., as appropriate. Note that each of those DBs is not illustrated in the figure.

When the order-placing person (the user) specifies the payment by electronic money, the electronic money system 6 receives, from the payment managing server 3, various necessary information for the payment by electronic money, and executes the payment process by electronic money. In order to do so, the electronic money system 6 includes a DB that stores the user information (information that associates the personal information, such as the name of the user and the age thereof, with account information for utilizing the electronic money), and a DB that stores a use record of the electronic money. Note that each of those DBs is not illustrated in the figure.

Multiple card company systems 5 and electronic money systems 6 may be provided in accordance with respective card brands (card companies) or with respective kinds of electronic money.

<2. Functional Structure>

A functional structure of the shop server 1 will be described with reference to FIG. 2. The shop server 1 includes an information obtaining unit 1a, a transmitting unit 1b, a printing control unit 1c, an invalidation commanding unit 1d, and a receiving unit 1e.

The information obtaining unit 1a executes a process of obtaining order identification information capable of identifying the order placed by the order-placing person.

The order identification information in this case will be described. The order identification information is information transmitted to the shop server 1 from the ordering terminal 7. That is, the information obtaining unit 1a obtains the order identification information from the ordering terminal 7.

The order identification information contains, for example, a shop code that can identify a shop, a table code that can identify the table where the order-placing person takes a seat, a unique guest code given to the order-placing person who visits the shop, takes the table and receives a service, and a date-and-time code that indicates a time at which the order is input.

When, for example, the shop code is "001", the table code is "013", a guest code is "002" (a number given to the order-placing person who is guided to the table on that day), and the date-and-time code is "20181122110341" (indicating Dec. 22, 2018, AM 11:03, 41 seconds), the order identification information is set to "00101300220181122110341". Note that when the order-placing person places an additional order, another piece of order identification information with a different date-and-time code is given to the additional order.

Needless to say, this order identification information is merely an example, and it is also possible to reduce the information quantity (the number of bits) of the order identification information by, for example, utilizing a code that indicates the number of placed orders instead of utilizing the date-and-time code.

When the ordering terminal 7 is a terminal that is utilized by the shop assistance, the table code and the guest code, etc., are input by the shop assistance, and the ordering terminal 7 generates the order identification information.

Moreover, when the ordering terminal 7 is a desktop installation type and is utilized by the order-placing person, the ordering terminal 7 may be configured to automatically generate the order identification information. When, for example, the ordering terminal 7 stores the shop code and the table code in advance, and when the order-placing person places a new order, a new guest code may be generated by adding "1" to the guest code that has been utilized immediately before, and the date-and-time code may be generated by obtaining date-and-time information at a timing at which the placed order is settled, and the order identification information may be generated by utilizing those pieces of information.

Furthermore, the shop server 1 may include a conversion table and the date-and-time information in advance to generate the shop code and the table code. In such a case, the shop server 1 may identify the ordering terminal 7 that has transmitted the order information, obtain the table code from the conversion table in accordance with the identified information, add the guest code in accordance with the sequence of visiting the shop, generate the date-and-time code from the date-and-time information at which the order information is received, and generate and obtain the order identification information using those pieces of information and the shop code stored in advance.

When the shop server 1 is configured to generate the order identification information, it becomes unnecessary for the ordering terminal 7 to execute the process of generating the order identification information. Hence, a process load is reduced, and an inexpensive terminal is applicable as the ordering terminal 7.

Note that because the table code and the guest code are given to the order identification information, the order identification information can be also considered as containing order-placing person identification information that distinguishes the order-placing person.

Moreover, because the order-placing person identification information contains the shop code, the order identification information for each shop generated by the same algorithm can be likewise handled. That is, since no duplicated order identification information is generated even if the shop differs, it is unnecessary to install a system that is different shop by shop. This enables a utilization of the same system across the different shops, thus contributing to reduction of the system installation costs.

The transmitting unit 1b executes a process of transmitting, to the payment managing server 3, the information on the order received via the ordering terminal 7. More specifically, the order identification information and amount information are transmitted to the payment managing server 3 as the payment information.

The amount information may indicate an amount of money for each article, or may be a total amount of money when a plurality of articles is ordered by a single order.

The printing control unit 1c executes, every time a single order is received, a process of causing a print medium like a payment-procedure sheet to be printed. Note that the printing control unit 1c in this example gives a command to print the code information like a one-dimensional bar code or a two-dimensional bar code on the print medium.

The code information contains at least the order identification information. The print medium on which the code information is printed is given to the order-placing person (the user) every time the print medium is printed. Note that the code information may contain payment amount information for the order.

The code information printed on the print medium is read by the user terminal 4 like a mobile phone owned by the order-placing person. The user terminal 4 that has read the code information transmits, to the payment managing server 3, a payment request. This enables the order-placing person to make a payment with respect to the order placed by such a person.

The invalidation commanding unit 1d executes, when the order-placing person places an additional order and a plurality of print media is given to the order-placing person, a process of transmitting, to the payment managing server 3, a command that invalidates other pieces of order identification information than the order identification information containing the latest additional order so as to validate only this order identification information.

The receiving unit 1e executes a process of receiving various kinds of information like a notification that the payment has been completed by the order-placing person.

A functional structure of the payment managing server 3 will be described with reference to FIG. 3.

The payment managing server 3 includes a payment information receiving unit 3a, a storing process unit 3b, a payment request receiving unit 3c, a payment process unit 3d, and an invalidation process unit 3e.

The payment information receiving unit 3a executes a process of receiving the payment information from the shop server 1, and of extracting the order identification information and the amount information from the payment information.

The storing process unit 3b executes a process of storing the extracted order identification information and the amount information in the payment DB 61.

The payment request receiving unit 3c executes a process of receiving a payment request. The payment request contains the order identification information that can identify the payment data, and also the paying information like information for identifying the payment method.

The paying information contains, for example, information for identifying the payment method that is selected by the order-placing person among the plural kinds of payment methods. Moreover, the paying information may contain information, such as a credit card number and a security code, and contain only the information that becomes a key for obtaining those pieces of information (e.g., user Identification (ID)).

The payment process unit 3d executes a process of transmitting the necessary information for making a payment to the card company system 5 and to the electronic money system 6, etc., based on the payment method specified by the order-placing person, and a process of receiving the information indicating that the payment has been completed.

The invalidation process unit 3e executes a process of invalidating the predetermined payment information based on the invalidation command received from the shop server 1. As for an example invalidation process, the corresponding record may be deleted, or the flag given to the corresponding record may be rewritten to the state indicating the invalidity from the state indicating the validity.

<3. Hardware Structure>

Figure 4:
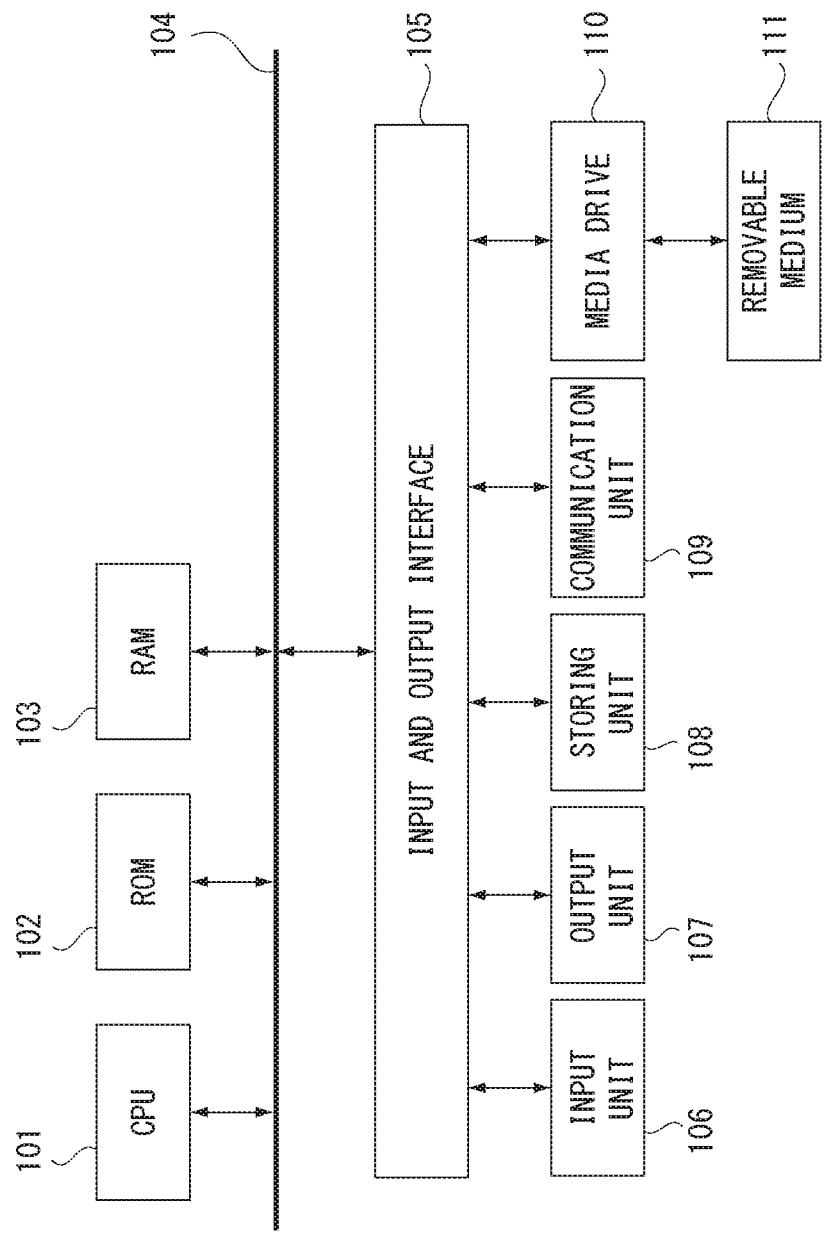
FIG. 4 is a block diagram of a computer apparatus according to the embodiment.

Various computer apparatuses and terminals that construct the shop server 1, the payment managing server 3, the user terminal 4, the card company system 5, and the electronic money system 6, and respective devices for the order DB 51 and for the payment DB 61 as illustrated in FIG. 1 may be accomplished by a computer apparatus capable of information processing and information communication as illustrated in FIG. 4.

Note that it is unnecessary for all computer apparatuses to include the respective units illustrated in FIG. 4 without excess or deficiency. An apparatus that has some units eliminated, an apparatus that includes a plurality of the same units, and an apparatus that employs a structure other than the structure illustrated in FIG. 4 is also applicable.

In FIG. 4, a Central Processing Unit (CPU) 101 of the computer apparatus executes various kinds of processes in accordance with the programs stored in a Read-Only Memory (ROM) 102 or the programs loaded to a Random-Access Memory (RAM) 103 from the storing unit 108. The RAM 103 also stores, as appropriate, necessary data, etc., for the CPU 101 to execute the various kinds of processes.

The CPU 101, the ROM 102, and the RAM 103 are mutually connected via a bus 104. This bus 104 is also connected to an input and output interface 105.

An input unit 106, an output unit 107, a storing unit 108, and a communication unit 109 are connected to the input and output interface 105.

The input unit 106 includes a keyboard, a mouse, and a touch panel, etc. The user terminal 4 according to this embodiment is provided with, as the input unit 106, a structure that obtains (images) the code information.

The output unit 107 includes a display, such as a liquid crystal display (LCD), a Cathode Ray Tube (CRT), or an organic ElectroLuminescence (EL) panel, and a speaker, etc.

The storing unit 108 includes a Hard Disk Drive (HDD), or a flash memory device, etc.

The communication unit 109 executes a communication process or an intra-communication between the devices via the network 1.

The input and output interface 105 is also connected to a media drive 110 as needed, a removable medium 111, such as a magnetic disc, an optical disc, a magneto-optical disc, or a semiconductor memory, is loaded therein as appropriate, and thus information writing and reading are executed on this removable medium 111.

According to such a computer apparatus, uploading or downloading of data or a program is executed via a communication by the communication unit 109. Moreover, transfer of the data or the program via the removable medium 111 is also enabled.

When the CPU 101 executes process operations in accordance with the various kinds of programs, necessary information processing and communication are executed for various computer apparatuses and terminals as the shop server 1, the payment managing server 3, the user terminal 4, the card company system 5, and the electronic money system 6, and for the order DB 51 and the payment DB 61.

Note that various computer apparatuses and terminals that serve as the shop server 1, the payment managing server 3, the user terminal 4, the card company system 5, and the electronic money system 6, and information processing devices for the order DB 51 and for the payment DB 61 are not limited to a structure in which a computer apparatus is constructed in solo as illustrated in FIG. 4, and a plurality of computer apparatuses may be connected to construct a system. The plurality of computer apparatuses may be connected via a LAN, etc., to construct a system, or may be placed at remote site via a VPN, etc., that utilizes the Internet, etc. The plurality of information processing devices may include information processing devices as a server group (a cloud) that is available by a cloud computing service.

Figure 2:
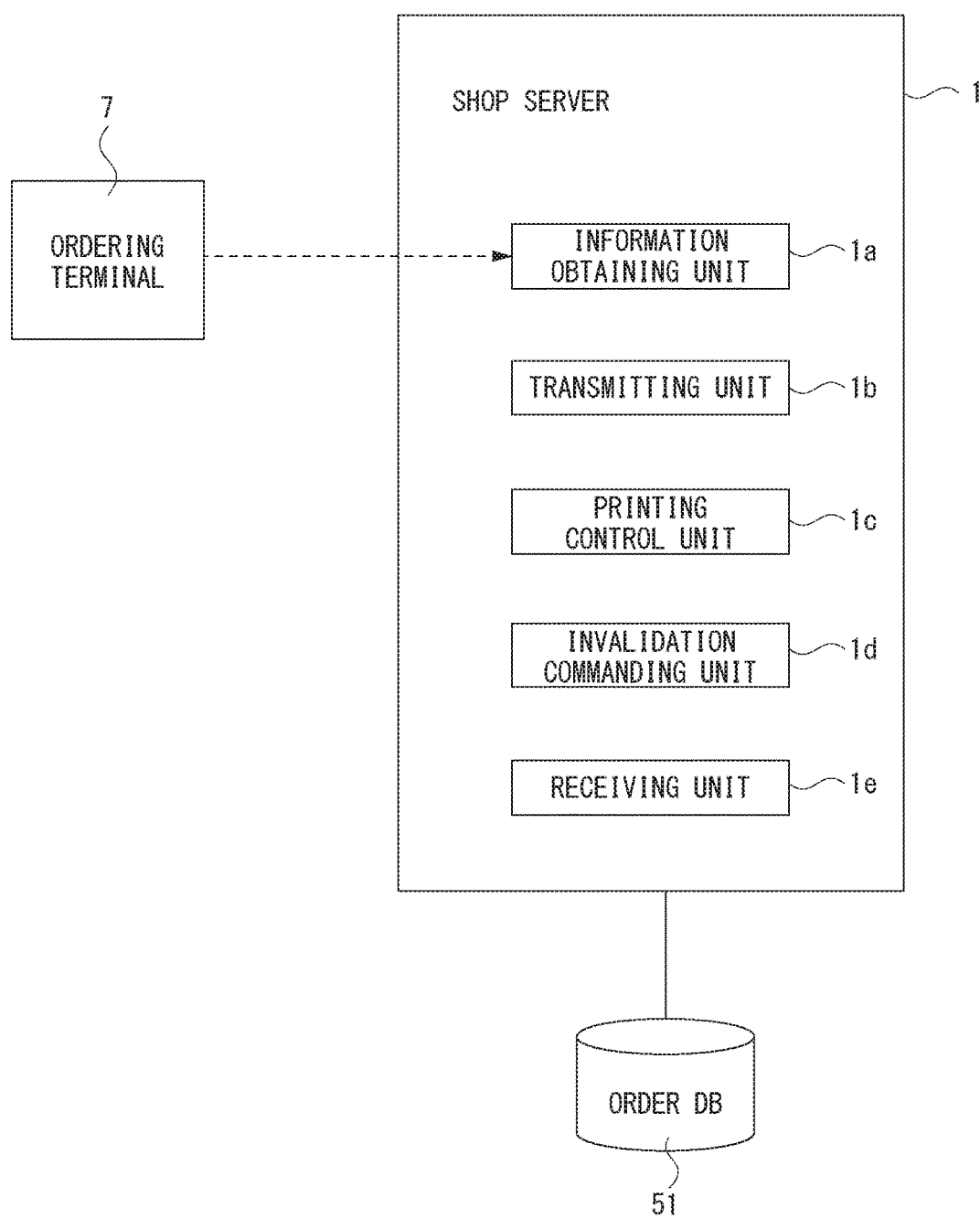
FIG. 2 is a diagram for describing a functional structure of the shop server according to the embodiment.
Figure 3:
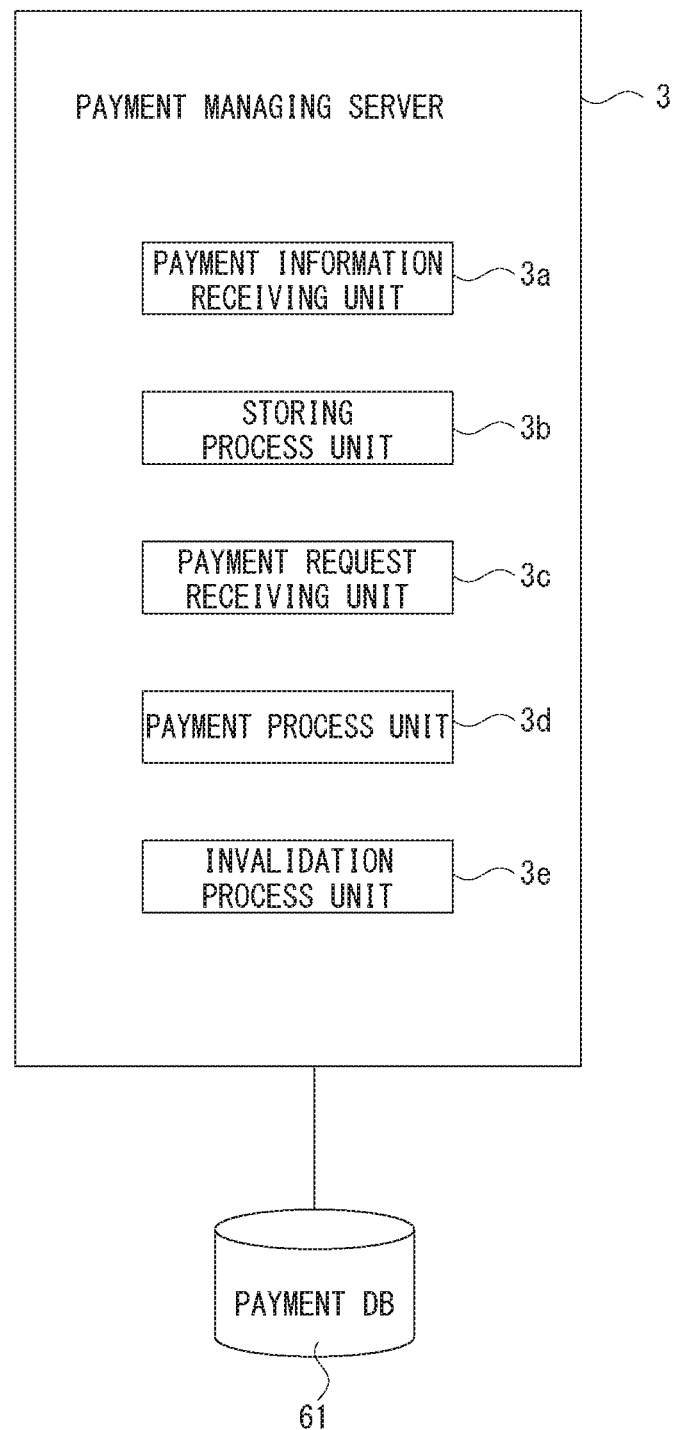
FIG. 3 is a diagram for describing a functional structure of a payment managing server according to the embodiment.

Each function as the shop server 1 illustrated in FIG. 2 and each function as the payment managing server 3 illustrated in FIG. 3 are accomplished by the processes executed by the CPU 101 of the information processing device in accordance with the program. However, the processes by all of or some of the structures to be described later may be accomplished by hardware resources.

Moreover, when each function is accomplished by software, it is unnecessary that each function is independently accomplished by individual program. Processes for the plurality of functions may be executed by a single program, or a single function may be accomplished by cooperative operations of a plurality of program modules.

Furthermore, the respective functions may be distributed in a plurality of information processing devices. Still further, a single function may be accomplished by the plurality of information processing devices.

The order DB 51 of the shop server 1 and the payment DB 61 of the payment managing server 3 may be accomplished in any form as long as the shop server 1 and the payment managing server 3 are respectively accessible. For example, the entire order DB 51 may be formed in the storing unit of the same system as the shop server 1, and a part of or the entire order DB 51 may be provided in separate and remote-site computer systems, etc. Needless to say, it is unnecessary that the order DB 51 is formed in the single device (e.g., a single hard disk drive). Moreover, it is unnecessary that the order DB 51 is constructed as a single DB. Each DB to be described in each following example merely exemplifies the form of a single DB that is a storing unit which stores information relating to the processes according to the embodiment.

<4. Outline of Process Flow>

First, with reference to an example illustrated in the accompanying figures, an outline of the flow of the process executed by each device will be described.

More specifically, respective processes (see FIG. 5) executed by the respective terminal and server when the order-placing person places a first order, respective processes (see FIG. 6) executed by the respective terminal and server when the order-placing person places an additional order, and respective processes (see FIG. 7) executed by the respective terminal and server when the payment with respect to the order is made by the order-placing person will be described in sequence.

Note that in the following description, a case in which a guest visits a shop like a restaurant and inquires foods will be taken as an example to describe the respective processes.

<4-1. Flow with Respect to First Order>

Figure 5:
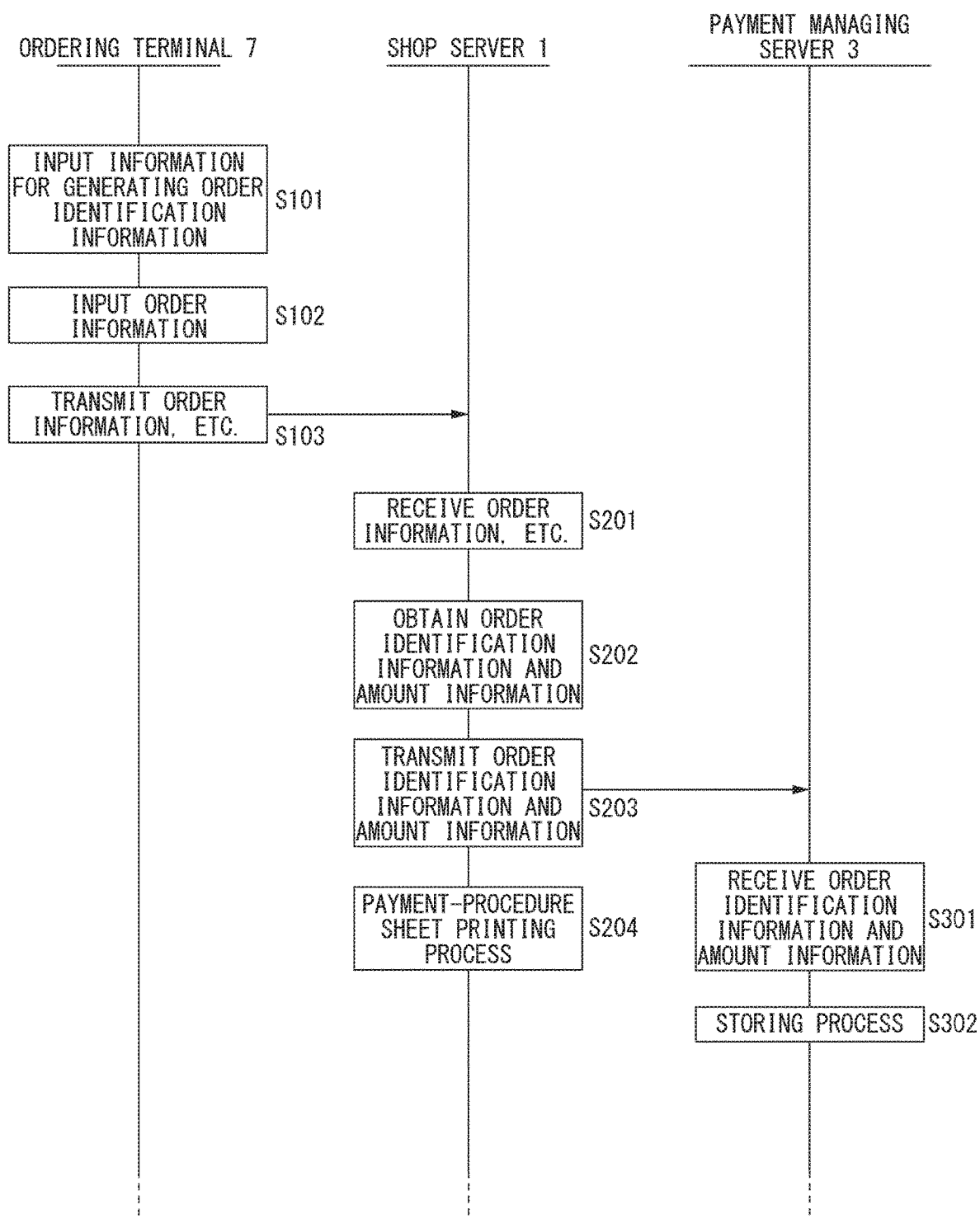
FIG. 5 is a diagram for describing respective processes executed by respective terminal and server when a person who places an order initially places an order.

With reference to FIG. 5, example respective processes in accordance with the first order will be described.

After a guest who visits the shop is directed to a table by a shop assistance, the shop assistance inputs information to the handheld-type ordering terminal 7 held by the shop assistance for generating order identification information.

For example, the shop assistance depresses a button (new button) indicating a reception of the new guest, and then inputs a table number (or a seat number at a counter table) where the guest has a seat. As for the ordering terminal 7, for example, the number of guests may be additionally input.

Based on the above-described shop assistance's operations, information for generating the order identification information is input in step S101 in the ordering terminal 7.

Next, the shop assistance takes an order from the guest, and inputs the information thereof in the ordering terminal 7. Hence, the order information is input in step S102 in the ordering terminal 7.

The input of the order information is executed by, for example, inputting a number for identifying the menu, and depressing a button for identifying the menu.

Note that in the following description, the guest who places the order will be referred to as the "order-placing person".

Subsequently, when the shop assistance depresses an order confirm button or an order transmission button, the ordering terminal 7 executes, in step S103, an order information transmitting process. The order information contains the information for generating the order identification information, and the information for identifying the menu ordered by the order-placing person.

Note that as for the information for generating the order identification information, for example, information for identifying whether the order is a new order or an additional order, and a table number are transmitted. Moreover, the order identification information may be generated and transmitted instead of the information for generating the order identification information.

The information like the order information transmitted by the process in step S103 is received by a process of the shop server 1 in step S201.

In the receiving process, a process of storing the received information in the order DB 51, and a process of generating the order identification information are executed.

Next, the shop server 1 executes, in step S202, a process of obtaining the order identification information and amount information. The amount information obtained in this step indicates the total amount of money for order placed by the order-placing person. Moreover, regarding the order identification information, when, for example, the shop code is "001", the table code is "013", and the guest code is "002", the initial order identification information becomes "001013002001". This order identification information contains order-placing person identification information (i.e., "001013002"). The order-placing person identification information differs from those of the other order-placing persons, and can identify the single order-placing person (or the order-placing person in a single group).

The shop server 1 executes, in step S203, a process of transmitting the order identification information and the amount information to the payment managing server 3 as the payment information.

The shop server 1 executes, in step S204, a process of causing a payment-procedure sheet to be printed. For example, a two-dimensional bar code is printed on the payment-procedure sheet printed in the payment-procedure sheet printing process. The two-dimensional bar code contains the order identification information, and the total amount of money for order placed by the order-placing person can be identified based on this information.

Note that the shop server 1 may be configured to receive a printing command transmitted from the payment managing server 3 so as to execute the printing process in step S204.

Moreover, the order identification information and the amount information (i.e., the "payment information") that have been transmitted by the process in step S203 are received by a process of the payment managing server 3 in step S301.

The payment managing server 3 executes, in subsequent step S302, a process of storing the order identification information and the amount information in the payment DB 61 in association with each other.

By executing the respective processes illustrated in FIG. 5, the information on the order placed by the order-placing person is stored in the order DB 51 that is managed by the shop server 1 and in the payment DB 61 that is managed by the payment managing server 3.

<4-2. Flow of Additional Order>

Figure 6:
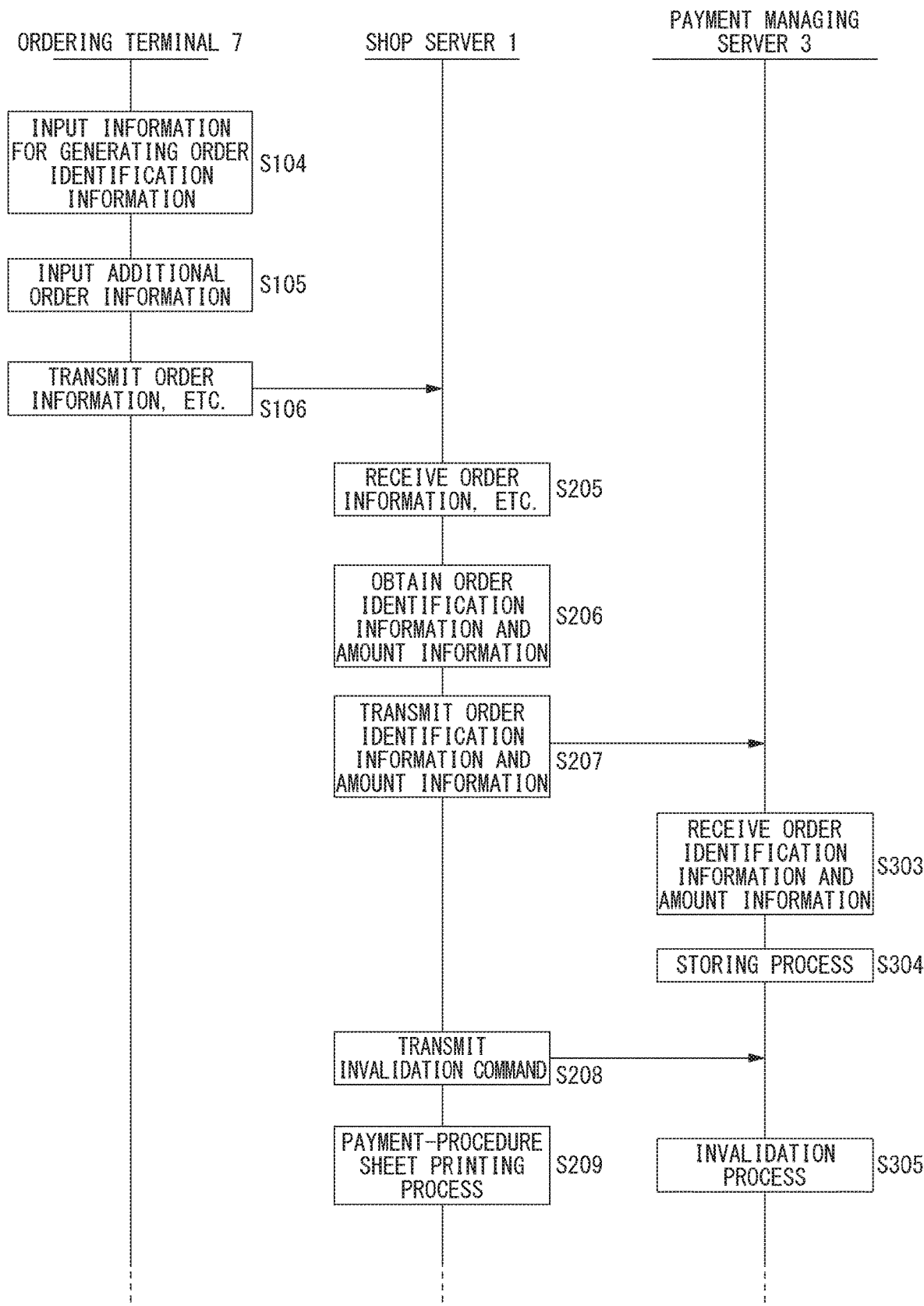
FIG. 6 is a diagram for describing respective processes executed by respective terminal and server when the order-placing person places an additional order.

With reference to FIG. 6, example respective processes in accordance with an additional order will be described.

The shop assistance who takes an order for the additional menu from the order-placing person who has already placed any order inputs, in the ordering terminal 7, each piece of information for the additional order. More specifically, the shop assistance depresses a button indicating the additional order, and inputs the table number.

Based on this operation, information for generating the order identification information is input at the ordering terminal 7 in step S104.

Next, the shop assistance inputs, in the ordering terminal 7 in step S105, additional order information. More specifically, a number identifying the menu is input, or a button for identifying the menu is depressed.

The ordering terminal 7 executes, in step S106, a process of transmitting the order information, etc. This process is similar to the process in step S103 in FIG. 5.

The information on the additional order transmitted in the process in step S106 is received by the shop server 1 in a process in step S205. In the receiving process in step S205, a process of storing the received information in the order DB 51, and a process of generating the order identification information are executed. Note that the order identification information generated in this process (or the order identification information generated by the ordering terminal 7) is different order identification information from the order identification information for identifying the details of the first order.

When, for example, the shop code is "001", the table code is "013", and the guest code is "002", the first order identification information on the first order becomes "001013002001", and the order identification information on the additional order which is the second order becomes "001013002002".

The shop server 1 obtains, in step S206, the order identification information and the amount information. The amount information obtained in this step is a total amount of money for order not paid yet among the plurality of orders placed by the same order-placing person.

When, for example, the amount of money for the first order is JP 1000 YEN, the amount of money for the additional order is JP 500 YEN, and when both the first and additional orders are not paid yet, the amount information obtained in step S206 becomes JP 1500 YEN.

The shop server 1 executes, in step S207, a process of transmitting the order identification information ("001013002002" in the above example) and the amount information ("1500" in the above example) as the payment information.

The payment information transmitted in step S207 is received by the payment managing server 3 in a process in step S303.

The payment managing server 3 executes, in step S304, a process of storing the received payment information in the payment DB 61. The respective processes in step S303 and in step S304 are the similar processes to those in step S301 and in step S302 illustrated in FIG. 5.

The shop server 1 that has completed the process in step S207 transmits, in step S208, the invalidation command. This process may be executed immediately after the process in step S207 without a confirmation on whether or not the processes in step S303 and in step S304 executed by the payment managing server 3 have been completed. That is, the process in step S208 may be executed before the process in step S303 is executed.

The payment information subjected to the invalidation command in step S208 is on the order which has been placed by the same order-placing person prior to the additional order at this time, has not been paid yet, and has not been invalidated yet by the invalidation command. That is, when the same order-placing person does not place an order prior to the order at this time, and when all orders prior to the order at this time have been already paid, the process in step S208 is not executed.

For example, in the process for the order illustrated in FIG. 5, since the order placed by the order-placing person is the first order, and no order is placed prior to this order, the process corresponding to step S208 in FIG. 6 is not executed.

A description will be given with reference to this example. The payment information subjected to the invalidation command in step S208 is the order identification information that is "001013002001".

Note that the term the "same order-placing person" in this embodiment does not include the same person who is accepted as a different guest who is visiting the shop. That is, when the guest who visited the shop in the past day but visits the shop as a new guest in the later day, this guest is excluded from the same order-placing person.

The payment managing server 3 that has received the invalidation command executes, in step S305, an invalidation process. The invalidation process is to invalidate the record that contains the target order identification information so that the record is excluded from the target of payment by the order-placing person.

The invalidation of the record is executed by, for example, updating a flag from a state indicating a validity to a state indicating an invalidity.

After executing the invalidation command, the shop server 1 executes, in step S209, a process of causing the payment-procedure sheet to be printed. The payment-procedure sheet printed in this step has a printed two-dimensional bar code that can identify the order identification information (in the case of this example additional order, "001013002002").

Note that the process in step S209 can be executed asynchronously with the process in step S305 executed by the payment managing server 3.

<4-3. Flow Relating to Payment>

Figure 7:
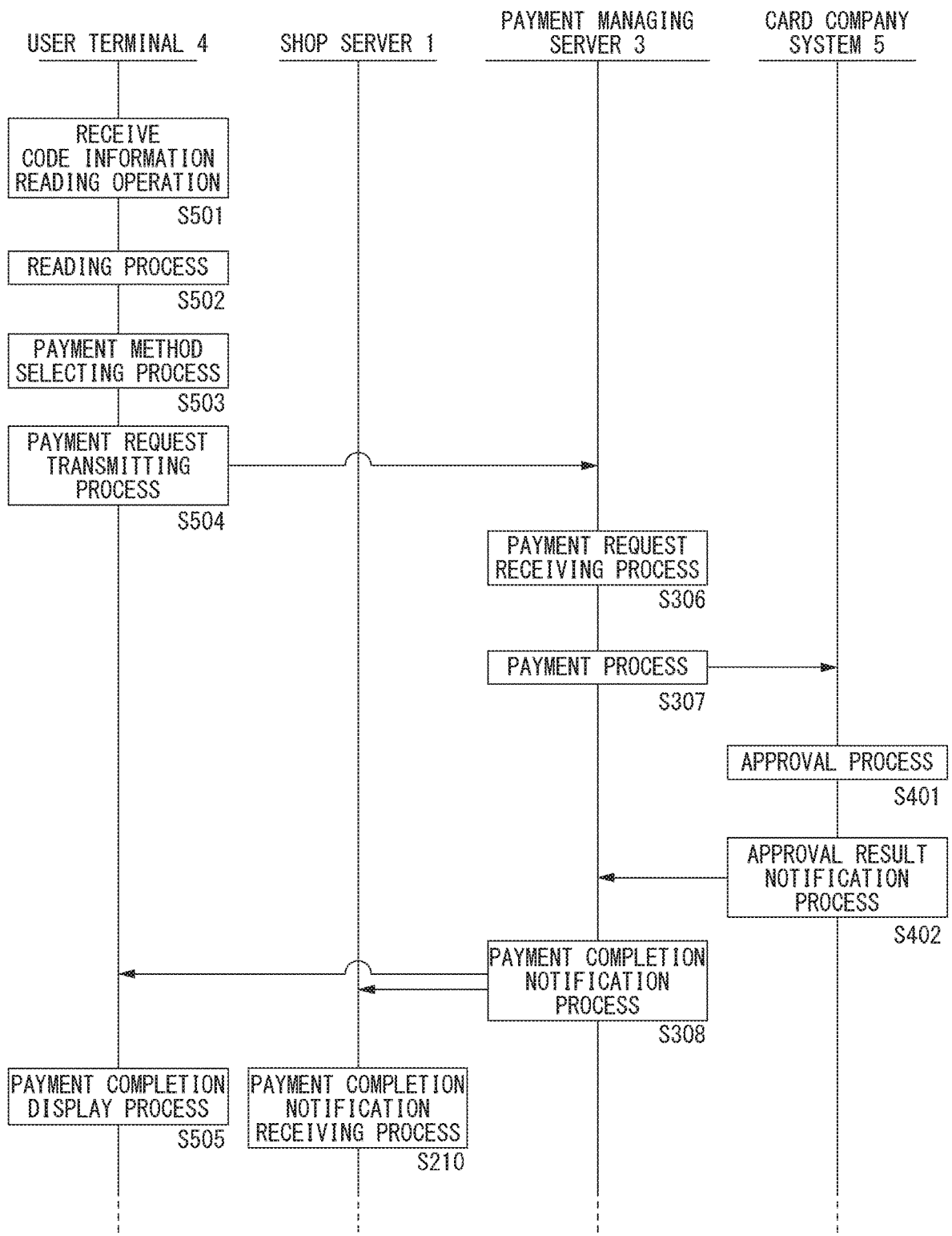
FIG. 7 is a diagram for describing respective processes executed by respective terminal and server when the order-placing person makes a payment with respect to an order.

With reference to FIG. 7, respective example processes when the order-placing person makes a payment will be described.

When the order-placing person wants to make a payment using the user terminal 4 like a mobile phone owned by such a person, and executes an operation of reading, by the user terminal 4, the two-dimensional bar code printed on the payment-procedure sheet, the user terminal 4 executes, in step S501, a process of receiving the reading operation for the code information (the two-dimensional bar code in this example), and executes, in subsequent step S502, a reading process. This allows the user terminal 4 to obtain the order identification information contained in the two-dimensional bar code.

Next, the user terminal 4 executes, in step S503, a process of identifying the payment method selected (specified) by the user (the order-placing person). This process is accomplished by, for example, displaying the plurality of payment methods on the screen, and by causing the user to select the one among those methods.

The user terminal 4 executes, in step S504, a payment request transmitting process.

In the payment request transmitting process, the information that contains the order identification information and the selected payment method is transmitted as a payment request. Note that in the payment request transmitting process, in addition to the order identification information and to the information that can identify the payment method, the amount of money to be paid may be transmitted. In that case, the user terminal 4 can obtain the amount of money to be paid by reading the code information.

The respective processes in steps S503 and S504 will be described with reference to an example case.

An application software (a "terminal application" below) exclusive for a payment using the code information (e.g., the two-dimensional code) printed on the payment-procedure sheet, etc., has been installed in the user terminal 4.

Upon input of a user ID and a password, the terminal application can execute various operations as a registered member (that is, various operations in a login state).

The information on the user ID and on the password is registered in a DB managed by the payment managing server 3. This DB also stores, for each user ID, credit card information, and point information, etc.

Since the credit card information and the point information are stored in the DB managed by the payment managing server 3, it is unnecessary for the order-placing person to input the credit card information for each payment as long as being in a login state. Hence, for example, only the information that indicates the user ID for identifying the user and the selection of the payment by credit card, and the order identification information are transmitted in the process in step S504.

Accordingly, because no transmission and reception of the credit card information is executed, a protection for the personal information can be accomplished. Moreover, a risk such that the input credit card information is furtively looked can be avoided.

Note that in the selection in step S503, a payment using the points, etc. is selectable. For example, a predetermined amount of money can be paid by points, and the remaining amount can be paid by credit card.

Note that by directly transmitting the image data on the read two-dimensional bar code in step S504, the obtaining process of the order identification information may be executed by a different terminal (e.g., the payment managing server 3) from the user terminal 4.

The payment managing server 3 executes, in step S306, a receiving process of the payment request in accordance with the process in step S504. In this process, the user ID is identified from the received information and the selected payment method is identified. Moreover, a process of obtaining the point information and the credit card information associated with the user ID is executed as needed.

The payment managing server 3 executes, in step S307, a payment process. FIG. 7 illustrates a case in which at least some of the amount of money for order is to be paid by credit card.

The payment managing server 3 transmits, in step S307, an approval request by transmitting various information to the card company system 5.

Various information transmitted in this step contains information on the amount of money to be paid by credit card, and information on the credit card, etc.

The card company system 5 that has received the approval request executes, in step S401, an approval process. In the approval process, for example, a checking process for the expiration date of the credit card, a validity checking process for the credit card (whether or not the credit card is listed up on a banned list), a checking process for the available amount of money by the credit card, etc., are executed.

The card company system 5 executes, in step S402, a process of notifying an approval result.

The result of the approval process is either "approved" or "not approved". When the approval result is "approved", the payment managing server 3 executes, in step S308, a payment completion notification process.

The payment completion notification process is executed for the shop server 1 and for the user terminal 4.

The shop server 1 that has received the payment completion notification updates, as a payment completion notification receiving process in step S210, the order information that has the payment completed among the pieces of order information stored in the order DB 51. In this updating process, for example, a process of storing a flag that indicates that the payment has been completed is executed.

In each piece of order information stored in the order DB 51 that is managed by the shop server 1, by providing the flag that indicates that the payment has been completed, a determination on whether or not the payment has been completed for each order identification information is enabled. This reduces a possibility such that the payment with respect to the amount of money for order is redundantly received, or the guest leaves the shop without a payment.

Moreover, the user terminal 4 that has received the payment completion notification in step S308 executes, in step S505, a payment completion display process. In this process, for example, a notification like "payment has been completed" is displayed on the screen of the user terminal 4.

Conversely, when the result of the approval process in step S401 is "not approved", the process in the subsequent step S308 is not executed, but information that indicates that the payment cannot be completed is transmitted from the payment managing server 3 to the shop server 1 and to the user terminal 4. Note that the payment managing server 3 may give no notification that the payment cannot be completed to the shop server 1.

The user terminal 4 that has received the information that indicates that the payment cannot be completed executes a process of displaying, on the screen, etc., a message like "payment inexecutable".

Moreover, when the payment by the specified payment method cannot be completed, the order-placing person utilizes another payment method, or makes the payment by cash.

Note that when the order-placing person selects the payment method that is to utilize electronic money, another process instead of the processes in step S401 and in step S402 are executed by an electronic money system that manages the electronic money.

More specifically, for example, a process of determining whether or not the user ID is valid, a process of determining whether or not the point balance is sufficient, and a process of subtracting the point by what corresponds to the payment amount from the balance of points, etc., are executed instead of the processes in step S401 and in step S402.

Note that like the respective processes in FIGS. 5, 6 and 7, a communication between the user terminal 4 and the shop server 1 is unnecessary. That is, since it is unnecessary for the shop server 1 to execute the process based on an expectation regarding various kinds of the user terminals 4, the program installed in the shop server 1 can be simplified. Therefore, the costs for constructing the shop server 1 can be reduced.

An example case in which the order-placing person who has completed the payment further places an additional order will be described with reference to FIGS. 6 and 7.

The ordering terminal 7 executes, based on the operation by the shop assistance, etc., the process of inputting the information for generating the order identification information in step S104, the process of inputting the information on the additional order in step S105, and the process of transmitting the order information, etc., in step S106, thereby executing the process of receiving the input additional order and of transmitting the information to the shop server 1. Since there is no order not paid yet, as illustrated in FIG. 5, the guest may be processed as the new visiting guest. In this case, for example, the order identification information that contains the new order-placing person identification information may be generated. For example, the new order identification information that is "001013003001" to which the shop code that is "001", the table code that is "013", the guest code that is "003", and a code "001" that indicates a first order are added may be generated.

The shop server 1 executes the process of receiving the order information, etc., in step S205, the process of obtaining the order identification information and the amount information in step S206, and the process of transmitting the order identification information and the amount information in step S207.

The amount information that is transmitted to the payment managing server 3 in step S207 indicates the amount of money that totals all the additional orders placed after the payment is once completed.

The shop server 1 that has executed the process in step S207 executes the invalidation command process in step S208. However, since there is no payment information not paid yet and to be invalidated, the process may progress to the process in step S209 without executing the process in step S208.

The payment managing server 3 executes the process of receiving the order identification information and the amount information in step S303, and the storing process in step S304, and then executes the invalidation process in step S305.

When, however, the shop server 1 does not execute the process in step S208, since no invalidation command is to be received, the process in step S305 is not executed. Moreover, even if the invalidation command is received, since there is no payment information to be invalidated in this example, in the invalidation process in step S305, a process of searching for the record subjected to the invalidation from each record stored in the payment DB 61, and of checking whether or not this record indicates that the payment has been completed (or a process of checking whether or not the record subjected to the invalidation does not exist) is executed.

Next, respective processes relating to the payment will be described with reference to FIG. 7.

The user terminal 4 executes, in accordance with the operation given by the order-placing person, a code information reading operation receiving process in step S501, a reading process in step S502, a payment method selecting process in step S503, and a payment request transmitting process in step S504. This causes the payment request to be transmitted to the payment managing server 3.

After receiving the payment request in step S306, the payment managing server 3 executes, in step S307, the payment process. The amount information to be transmitted to the card company system 5 in this step is the total amount of money for the additional order placed after the last payment has been completed.

For example, provided that a menu by what corresponds to JP 1000 YEN is ordered by the first order, a menu by what corresponds to JP 500 YEN is additionally ordered, and the payment by JP 1500 YEN is made by the payment process. Subsequently, when, as an additional order, a menu by what corresponds to JP 300 YEN is ordered, the amount information to be transmitted to the card company system 5 in the payment process in step S307 becomes JP 300 YEN.

The card company system 5 executes the approval process in step S401, and the approval result notification process in step S402. This causes the approval result to be notified to the payment managing server 3.

The payment managing server 3 executes, in step S308, the payment completion notification process. In response, the user terminal 4 executes the payment completion display process (step S505), and the shop server 1 executes the payment completion notification receiving process (step S210).

In the payment completion notification process in step S210, when the same order-placing person places the additional order after completing the payment, only the order information on this additional order is stored as the order information not paid yet in the order DB 51. This clearly distinguishes the order information not paid yet from the order information already paid, and thus a redundant payment with respect to the order information already paid is prevented.

Note that in FIG. 5, FIG. 6, and FIG. 7, respectively, although a handling (ACK etc.) for receipt confirmation may be executed every time the information is transmitted and received, illustration of such process is omitted.

<5. Each Process>

In order to achieve the flows of the processes by the respective devices illustrated in FIG. 5, FIG. 6, and FIG. 7, respectively, example processes executed by the shop server 1, the payment managing server 3 and the user terminal 4 will be described with reference to the accompanying figures.

<5-1. Order Information Receiving Process>

An example order information receiving process executed by the shop server 1 will be described with reference to FIG. 8.

Figure 8:
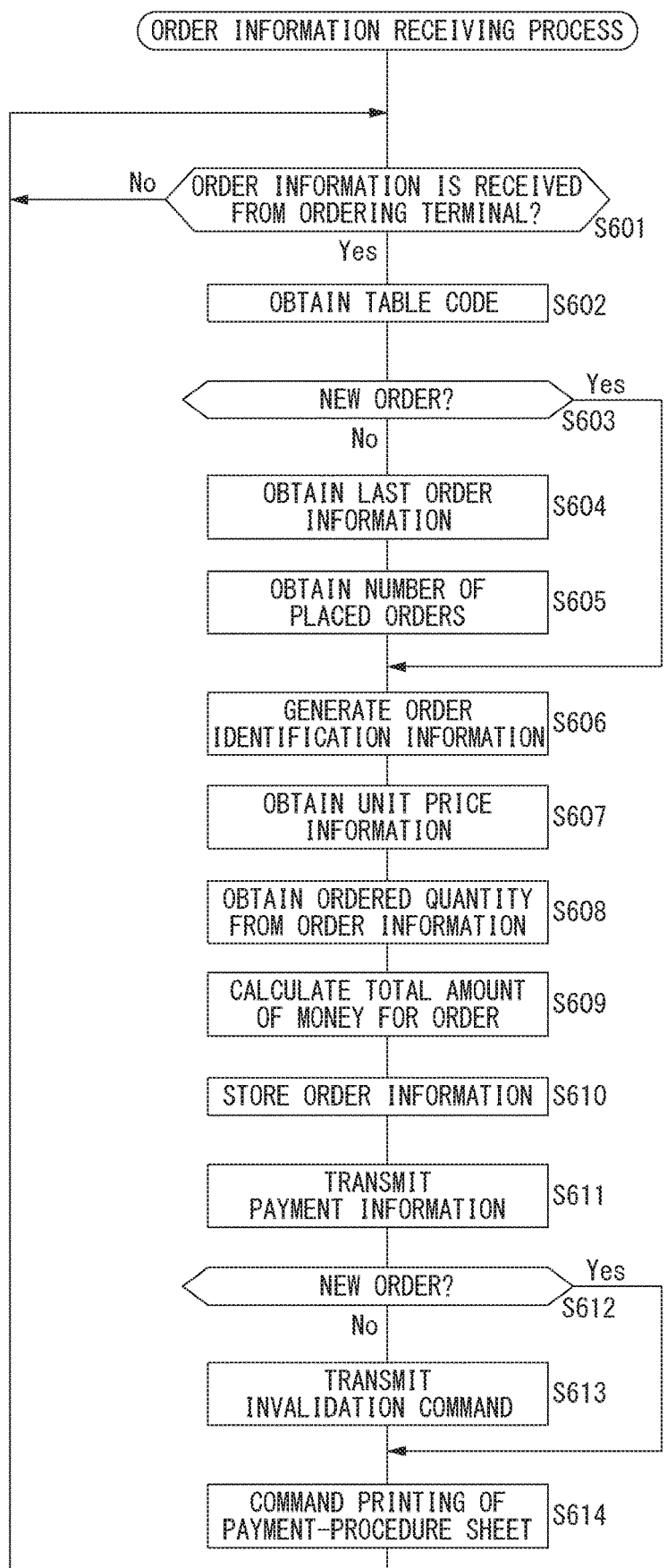
FIG. 8 is a flowchart illustrating an example order information receiving process.

Note that execution of the successive processes in FIG. 8 achieves execution of the respective processes in step S201 to step S204 in FIG. 5, and the respective processes in step S205 to step S209 in FIG. 6.

The shop server 1 determines, in step S601, whether or not the order information is received from the ordering terminal 7. When the order information has not been received yet, the shop server 1 executes again the process in step S601. Note that upon a trigger that is to receive the order information, the shop server 1 may be configured to execute the respective processes subsequent to step S602.

When determining that the order information is received from the ordering terminal 7, the shop server 1 obtains, in step S602, the table code from the received order information.

The shop server 1 determines, in step S603, whether or not the received order information is for a new order. Information on whether or not it is a new order is obtainable from the order information received from the ordering terminal 7.

When it is a new order, the shop server 1 progresses the process to step S606 without executing the respective processes in step S604 and in step S605.

Conversely, when it is not a new order i.e., when it is an additional order, the shop server 1 executes, in step S604, a process of obtaining the last order information from the order DB 51.

Note that at a stage at which the process in step S604 is being executed, as for the information stored in the order DB 51, already-received order information other than the order information received at this time from the ordering terminal 7 is stored. The order information received at this time is stored in the order DB 51 by a process in step S610 to be described later.

Accordingly, the term last order information is information on the order that is placed by this order-placing person, and on the latest order stored in the order DB 51. When, for example, this order is a second order after the guest visits the shop, since the order information stored in the order DB 51 at this time is only the information on the first order, the order information on the first order is obtained in the process in step S604.

In the process in step S604, a search process based on the order-placing person identification information is executed. More specifically, the record that contains the shop code "001", the table code "013", and the guest code "002", i.e., the record that contains the order-placing person identification information that indicates the order-placing person who placed the order at this time is searched for.

Note that among the pieces of information for searching for the record, the shop code is information that is managed by the shop server 1. Moreover, the table code and the guest code are contained in the order information received from the ordering terminal 7.

Now, a specific example structure of the order-placing person identification information and that of the order identification information will be described with reference to FIG. 9A.

FIG. 9A illustrates some pieces of example information which are stored in the order DB 51 that is managed by the shop server 1 and which are extracted for the purpose of description.

Stored for a record No. that can identify a single record are the shop code, the table code, the guest code, the number of placed orders, the details of the order, the total amount of money, and the flag that indicates that the payment has been already made, respectively.

The shop code, the table code, and the guest code are the same as described above.

Regarding the number of placed orders, the first order is set to 001, and the number of placed orders is incremented by 1 every time an additional order is subsequently received. The details of the order contain plural sets of information, and each set contains a menu No. and the number of items. The record illustrated in FIG. 9A indicates that the order which contains a menu which has the menu No. that is "019" and a menu which has the menu No. that is "031", and two menus which have the menu No. "024" is received.

As illustrated in FIG. 9A, the order-placing person identification information contains three pieces of information: the shop code; the table code; and the guest code. That is, the order-placing person can be uniquely identified based on the shop code, the table code, and the guest code.

Moreover, in addition to the shop code, the table code, and the guest code, the order identification information contains the information on the number of placed orders. That is, the order information can be uniquely identified based on the shop code, the table code, the guest code, and the number of placed orders.

Returning to the description with reference to FIG. 8, in the process in step S604, among the orders placed by the order-placing person who can be identified based on the shop code "001", the table code "013" and the guest code "002", the last order, i.e., the information with the largest number of placed orders is obtained from the order DB 51. Hence, for example, the record with the record No. "000001" that has the number of placed orders that is "001" is obtained as the last order information.

Next, the shop server 1 obtains, in step S605, the number of placed orders. In this example, "001" is obtained.

The shop server 1 executes, in step S606, a process of generating the order identification information on the order information at this time. More specifically, regarding the shop code, the table code, and the guest code, the obtained record is directly utilized, and the number of placed orders is calculated as "002" by adding 1 to the obtained value.

Note that because the order at this time is a new order and the process in step S606 is executed without the processes in step S604 and in step S605, the number of placed orders for this order is set to "001".

The shop server 1 generates, in step S606, the order identification information. The order identification information is generated from, for example, the shop code, the table code, the guest code, and the number of placed orders, and can uniquely identify the order placed by the order-placing person. As is clear from FIG. 9A, plural pieces of order identification information may be associated with the piece of order-placing person identification information.

The shop server 1 obtains, in step S607, the unit price information for each menu regarding the received order. The unit price information will be described with reference to FIG. 9B.

The unit price information is stored in a DB that stores the unit price for each article (menu) on sale at the shop. The shop server 1 manages this DB. FIG. 9B illustrates example information stored in the DB. As illustrated in the figure, the unit price information is stored in association with the menu No. that can uniquely identify the menu.

The unit price information obtained in step S607 is only the unit price information on the menu No. contained in the order information received from the ordering terminal 7. With the last order (the order information that has the record No. "000001" in FIG. 9A) being as an example, the pieces of unit price information on the menus that have the menu Nos. which are "024", "031", and "019" are at least obtained.

The shop server 1 obtains, in step S608, the ordered quantity from the order information. With the last order being as an example, the ordered quantity which is 2 for the menu with the menu No. "024", is 1 for the menu with the menu No. "031", and is 1 for the menu with the menu No. "019" is obtained.

The shop server 1 calculates, in step S609, the total amount of money for order. The total amount of money for order can be calculated from the unit price information obtained in step S607 and from the ordered quantity obtained in step S608.

The shop server 1 executes, in step S610, a process of storing the order information at this time in the order DB 51. For example, the record have pieces of information that are the record No. "000002", the shop code "001", the table code "013", the guest code "002", and the number of placed orders "002", and the information received from the ordering terminal 7 stored in the order details. This record has the total amount of money for order calculated in step S609 stored in the total amount of money. Moreover, this record has the already-paid flag set to "False". Eventually, this record is stored in the order DB 51.

Note that the already-paid flag is changed to "True" when the payment is made for the order. Accordingly, when the new order information is stored in the order DB 51, "False" is set for the flag.

The shop server 1 executes, in step S611, a process of transmitting the payment information to the payment managing server 3. In this process, for example, information that contains at least the order identification information and the total amount of money for unpaid order is transmitted to the payment managing server 3.

Note that the total amount of money for unpaid order may be a total amount of money obtained by adding the total amount of money of plural pieces of order information.

For example, the total amount of money for order information which is on the order-placing person who can be identified with the shop code "001", the table code "013", and the guest code "002" and which is not paid yet is "JP 2960 YEN" obtained by adding the total amount of money (i.e., "JP 2460 YEN") of the last order information (which is the first order information and which has the record No. "000001"), and the total amount of money (e.g., "JP 500 YEN") for the order information newly stored in step S610.

Note that when there are a plurality of records which is already paid and a plurality of records which is unpaid, the amount of money obtained by totaling the total amount of money for order information not paid yet is obtained, and the amount of money for the record already paid is excluded.

The shop server 1 determines, in step S612, whether or not the order placed at this time is a new order. This determining process is the similar determining process in step S603.

When the order at this time is a new order, the shop server 1 progresses the process to step S614 without executing a process in step S613.

Conversely, when the order at this time is not a new order, i.e., is an additional order, the shop server 1 executes the process in step S613.

A process of transmitting the invalidation command to the payment managing server 3 is executed in step S613.

In the transmission of the invalidation command, the information that can identify at least the payment information subjected to the invalidation is transmitted. The information that can identify the payment information subjected to the invalidation is, for example, the order identification information and the order-placing person identification information.

In this example, the order identification information subjected to the invalidation which is "001013002001" is transmitted.

After executing step S613, or after determining in step S612 that the order at this time is a new order, the shop server 1 executes, in step S614, a process of commanding the printing of a payment-procedure sheet. This causes the payment-procedure sheet to be printed. Note that as described above, the code information that can identify the order identification information is printed on the payment-procedure sheet.

After executing step S614, the shop server 1 returns the process to step S601 again.

<5-2. Payment Information Receiving Process>

An example payment information receiving process executed by the payment managing server 3 will be described with reference to FIG. 10.

Figures 10, 11:
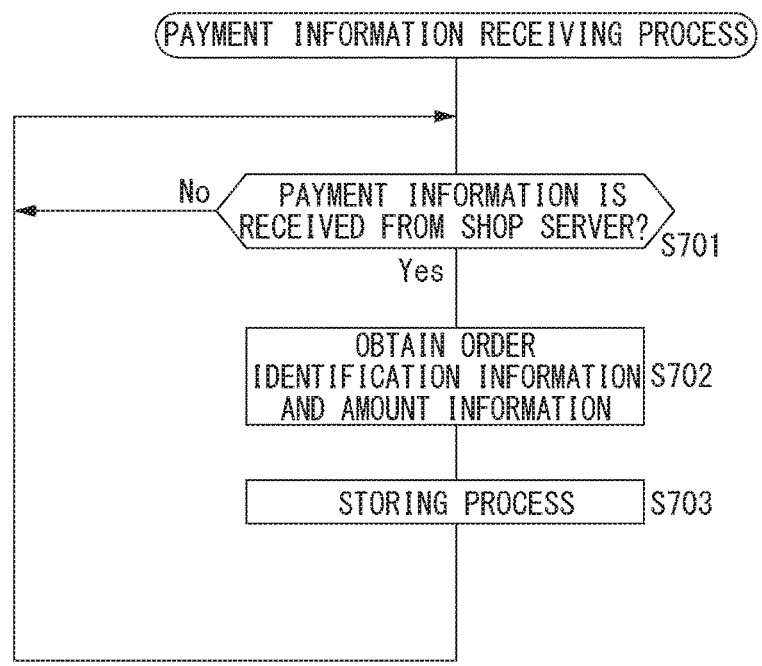
FIG. 10 is a flowchart illustrating a payment information receiving process.
FIG. 11 is a diagram for describing information stored in a payment DB.

Note that execution of the successive processes illustrated in FIG. 10 achieves the execution of the respective processes in step S301 and in step S302 illustrated in FIG. 5, and, in step S303 and in step S304 illustrated in FIG. 6.

The payment managing server 3 executes, in step S701, a process of determining whether or not the payment information is received from the shop server 1. When determining that such information has not been received yet, the payment managing server 3 executes the process in step S701 again. Note that upon a trigger that is to receive the payment information, the payment managing server 3 may be configured to execute the processes in step S702 and in step S703.

The payment managing server 3 that determines the payment information being received obtains, in step S702, the order identification information and the amount information from the received information.

Next, the payment managing server 3 executes, in step S703, a process of storing the obtained order identification information and amount information in the payment DB 61 in association with each other.

An example information stored in the payment DB 61 will now be described with reference to FIG. 11.

The payment information stored in the payment DB 61 has the record No. which can uniquely identify the single record and which is associated with the order identification information, the amount information, the validation flag, and the already-paid flag.

The order identification information is generated from, for example, the shop code "001", the table code "013", the guest code "002", and the number of placed orders "001", and is given every time the order-placing person places an order. The amount information indicates the total amount of money that must be paid when the order-placing person makes a payment. That is, it may be the sum of the total amounts of money for order information by multiple times.

The validation flag indicates whether the payment regarding the record is valid or invalid. In the state illustrated in FIG. 11, the validation flag is set to "True" and indicates a state in which a payment with respect to the record can be made.

Note that, as described above, when an additional order by JP 500 YEN is placed and the total amount of money becomes JP 2960 YEN, by receiving the payment information for the corresponding order information from the shop server 1, in step S703, the record which has the record No. newly set to "002", the order identification information set to "001013002002", the amount information set to "2960", the validation flag set to "True", and the already-paid flag set to "False" is stored in the payment DB 61.

Moreover, at a time point at which such information is stored in the payment DB 61, the validation flags for both the records that have the record No. "001", and the record No. "002" are set to "True."

After executing step S703, the payment managing server 3 returns the process to step S701 again.

<5-3. Invalidation Command Receiving Process>

An example invalidation command receiving process executed by the payment managing server 3 will be described with reference to FIG. 12.

Figure 12:
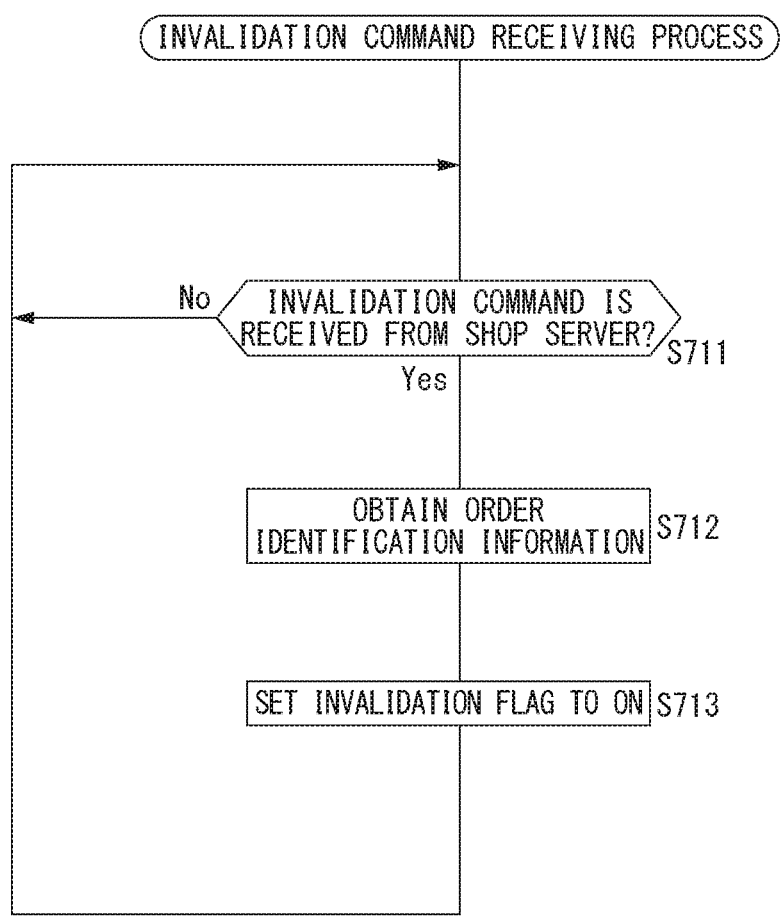
FIG. 12 is a flowchart illustrating an example invalidation command receiving process.

Note that execution of the successive processes illustrated in FIG. 12 achieves the execution of the process in step S305 illustrated in FIG. 6.

The payment managing server 3 determines, in step S711, whether or not the invalidation command is received from the shop server 1. When the invalidation command has not been received yet, the payment managing server 3 executes the process in step S711 again. Note that upon a trigger that is to receive the invalidation command, the payment managing server 3 may be configured to execute the processes in step S712 and in step S713.

When determining that the invalidation command is received, the payment managing server 3 executes, in step S712, a process of obtaining the order identification information for identifying the payment information subjected to the invalidation from the received information.

For example, the order identification information that is "001013002001" is obtained.

Next, the payment managing server 3 executes, in step S713, a process of changing the validation flag on the payment information relating to the specified order identification information to "False". This process is equivalent to setting the invalidation flag to "ON". According to the above-described example, at the time point at which the record with the record No. "002" is stored in the payment DB 61, the validation flags for both the record with the record No. "001" and the record with the record No. "002" are both "True", but execution of the process in step S713 sets the validation flag for the record with the record No. "001" to "False". That is, since only the validation flag for the record with the record No. "002" is set to "True", a payment is prevented from being improperly made based on the insufficient amount of money in accordance with the first order information.

After executing step S713, the payment managing server 3 returns the process to step S711 again.

<5-4. Terminal Application Launching Process>

An example terminal application launching process executed by the user terminal 4 will be described with reference to FIG. 13. Note that the successive processes illustrated in FIG. 13 are executed by the user terminal 4 in response to an execution of an operation for launching a terminal application exclusive for making a payment on the user terminal 4 used by the user himself/herself.

Figure 13:
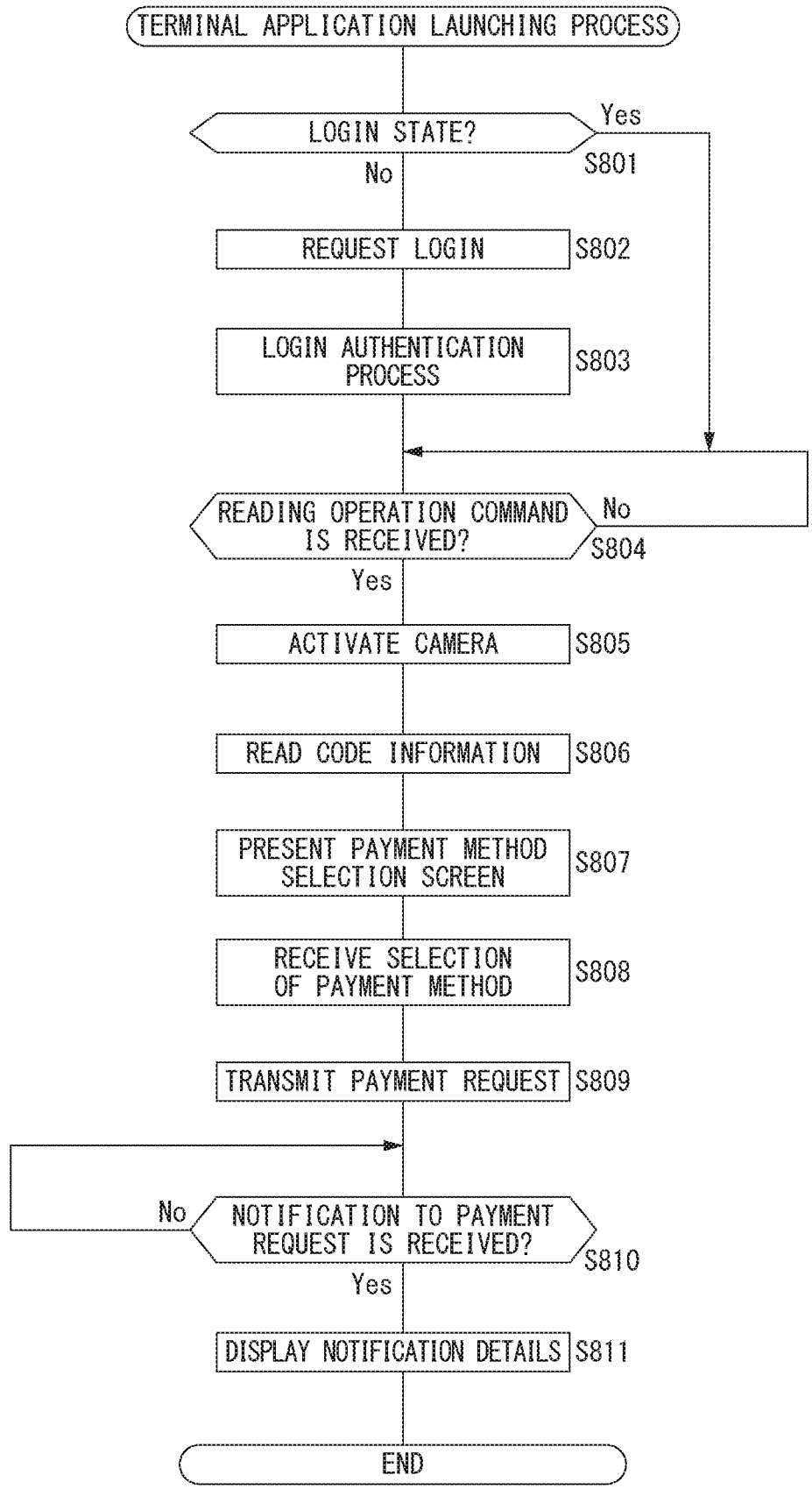
FIG. 13 is a flowchart illustrating an example terminal application launching process.

Execution of the successive processes illustrated in FIG. 13 by the user terminal 4 achieves respective processes from step S501 to step S505 in FIG. 7.

The user terminal 4 that detects the launching operation of the terminal application determines, in step S801, whether or not it is in a login state. When it is not in a login state, the user terminal 4 gives, in step S802, a login request to the user. More specifically, a user ID enter field, a login password enter field for login and a login button to start the execution of an authentication process are displayed on a screen.

When the user enters the user ID and the login password, and depresses the login button, the user terminal 4 executes, in step S803, a login authentication process. More specifically, the entered user ID and password are encrypted and transmitted to the payment managing server 3 to execute the authentication process, and the authentication result is received and displayed.

When the authentication result is "improper", the user terminal 4 gives the login request again in step S802.

After executing the login authentication process, the user terminal 4 determines, in step S804, whether or not reading operation command is received. The user terminal 4 stands by in step S804 until the reading operation command is given.

When the user makes an operation to command the reading operation, the user terminal 4 executes in step S805, a process of activating a camera of the user terminal 4.

Subsequently, in response to the user's camera operation, the user terminal 4 reads, in step S806, the code information. The code information contains at least the order identification information as described above.

Subsequently, the user terminal 4 executes, in step S807, a process of presenting a payment method selection screen. For example, the user terminal 4 executes a process of displaying the plurality of selectable payment methods on the screen, and prompting the user to select the method.

When the user selects the payment method, the user terminal 4 executes, in step S808, a process of receiving the selection operation for the payment method, and executes, in step S809, a process of transmitting the payment request to the payment managing server 3.

Regarding the payment request, a process is executed which transmits, for example, the information for identifying the user in use such as the user ID, the code information that contains the order identification information read in step S806, and the information for identifying the payment method selected by the user.

Next, the user terminal 4 determines, in step S810, whether or not a notification to the payment request is received. Example notifications to the payment request are a "payment completion notification" that indicates the completion of the payment, or a "payment inexecutable notification" that indicates that the payment cannot be made because of some reason.

When the payment completion notification is received, the user terminal 4 executes, as the process of displaying the notification details in step S811, a process of displaying a payment completion display on the screen of the user terminal 4.

Until the notification to the payment request is received, the user terminal 4 stands by at the process in step S810.

Note that when the payment inexecutable notification is received in step S810, the user terminal 4 executes, as the notification details displaying process in step S811, a process of displaying the payment inexecutable display on the screen.

<5-5. Payment Request Receiving Process>

An example payment request receiving process to be executed by the payment managing server 3 will be described with reference to FIG. 14.

Figure 14:
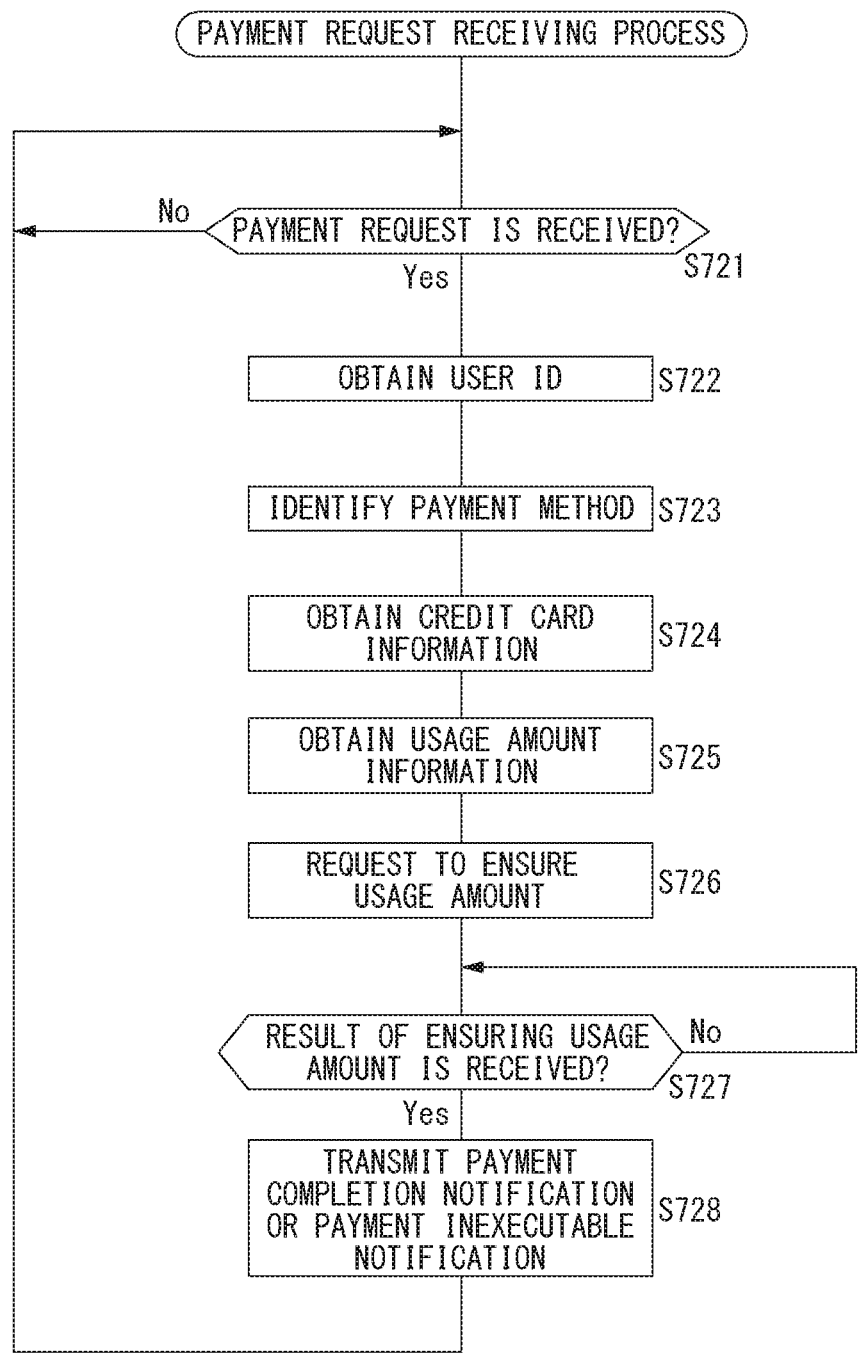
FIG. 14 is a flowchart illustrating an example payment request receiving process.

Note that execution of the successive processes illustrated in FIG. 14 achieves the execution of the respective processes in step S306, step S307, and step S308 in FIG. 7.

The payment managing server 3 determines, in step S721, whether or not the payment request is received from the user terminal 4. When the payment request has not been received yet, the payment managing server 3 executes the process in step S721 again. Note that upon a trigger that is to receive the payment request, the payment managing server 3 may be configured to execute the respective processes from step S722 to step S727.

The payment managing server 3 that has determined that the payment request is received executes, in step S722, a process of obtaining the user ID.

Subsequently, the payment managing server 3 executes, in step S723, a process of identifying the payment method. This process is to obtain the information for identifying the payment method from the information that is received as the payment request.

The payment managing server 3 executes, in step S724, a process of obtaining the information according to the payment method from the DB. FIG. 14 illustrates an example case in which the user selects the payment by credit card. Hence, the information on the credit card is obtained from the DB in step S724. Note that when the payment method is to utilize the points, the point information is obtained from the DB. Moreover, when the payment method is to utilize electronic money, the information on the electronic money is obtained from the DB.

The payment managing server 3 obtains, in step S725, the usage amount information. This process is to obtain the order identification information from the information received as the payment request, and obtains, based on the order identification information, the amount information from the payment DB 61 (see FIG. 11).

The payment managing server 3 requests, in step S726, the card company system 5 to ensure the usage amount of money. This causes the card company system 5 to check the expiration date of the specified credit card, and verify the availability, etc.

The payment managing server 3 stands by, in step S727, until receiving the result of ensuring the usage amount.

When the result of ensuring the usage amount is received, the payment managing server 3 transmits, in step S728, the payment completion notification or the payment inexecutable notification. Accordingly, the payment completion notification or the payment inexecutable notification is transmitted to the user terminal 4 and to the shop server 1.

Note that the shop server 1 changes the already-paid flag of the target record stored in the order DB 51 from "False" to "True" by receiving the payment completion notification (see FIG. 9A).

Note that when the payment by electronic money is specified as the payment method, although the example case in which the information on the electronic money is obtained from the DB managed by the payment managing server 3 in step S724 is described, other cases are also expectable. For example, the payment managing server 3 may execute a process of obtaining the information on electronic money (e.g., the available balance) from the DB that is managed by the electronic money system 6. In this case, together with the predetermined process relating to the payment by electronic money, the electronic money system 6 may be requested to obtain the information on the electronic money. In this case, also, the information on login, etc., may be transmitted and received between the user terminal 4 and the electronic money system 6.

<6. Outline of Process Flow According to Second Embodiment>

According to a second embodiment, what is different from the above-described embodiment (the "first embodiment" below) is that the payment managing server 3 executes the process of giving the printing command, and the shop server 1 does not give the invalidation command.

In the following description, the differences from the first embodiment as described with reference to respective figures that are FIG. 2 to FIG. 14 will be described below, and the description for the similar features to the first embodiment will be simplified or omitted.

First, a structure of a shop server 1A and that of a payment managing server 3A according to the second embodiment will be described.

Figure 15:
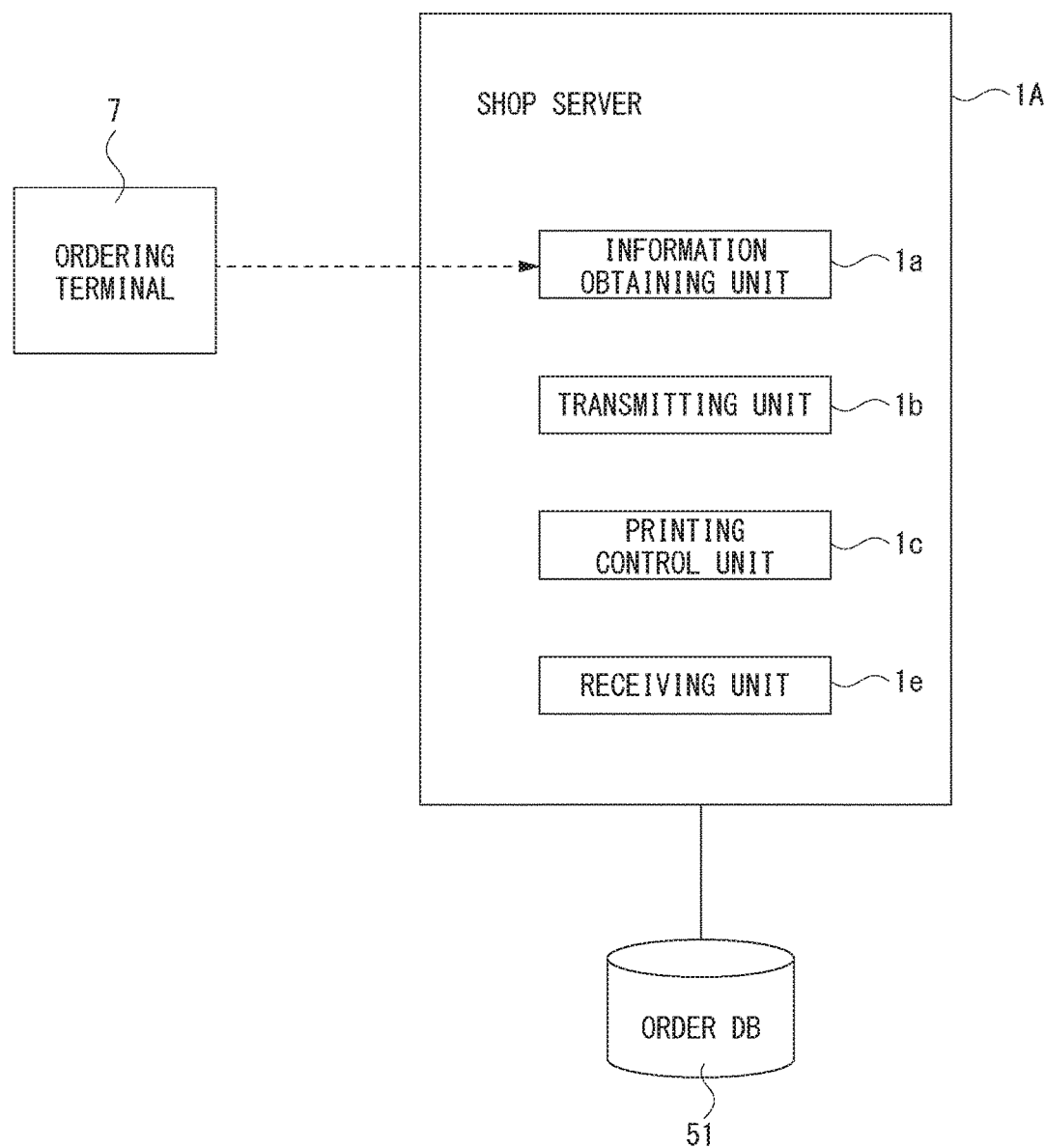
FIG. 15 is a diagram for describing the functional structure of a shop server according to a second embodiment.

As illustrated in FIG. 15, the shop server 1A according to the second embodiment includes an information obtaining unit 1a, a transmitting unit 1b, a printing control unit 1c, and a receiving unit 1e. That is, a feature is that an invalidation commanding unit 1d is eliminated in comparison with the shop server 1 according to the first embodiment.

Figure 16:
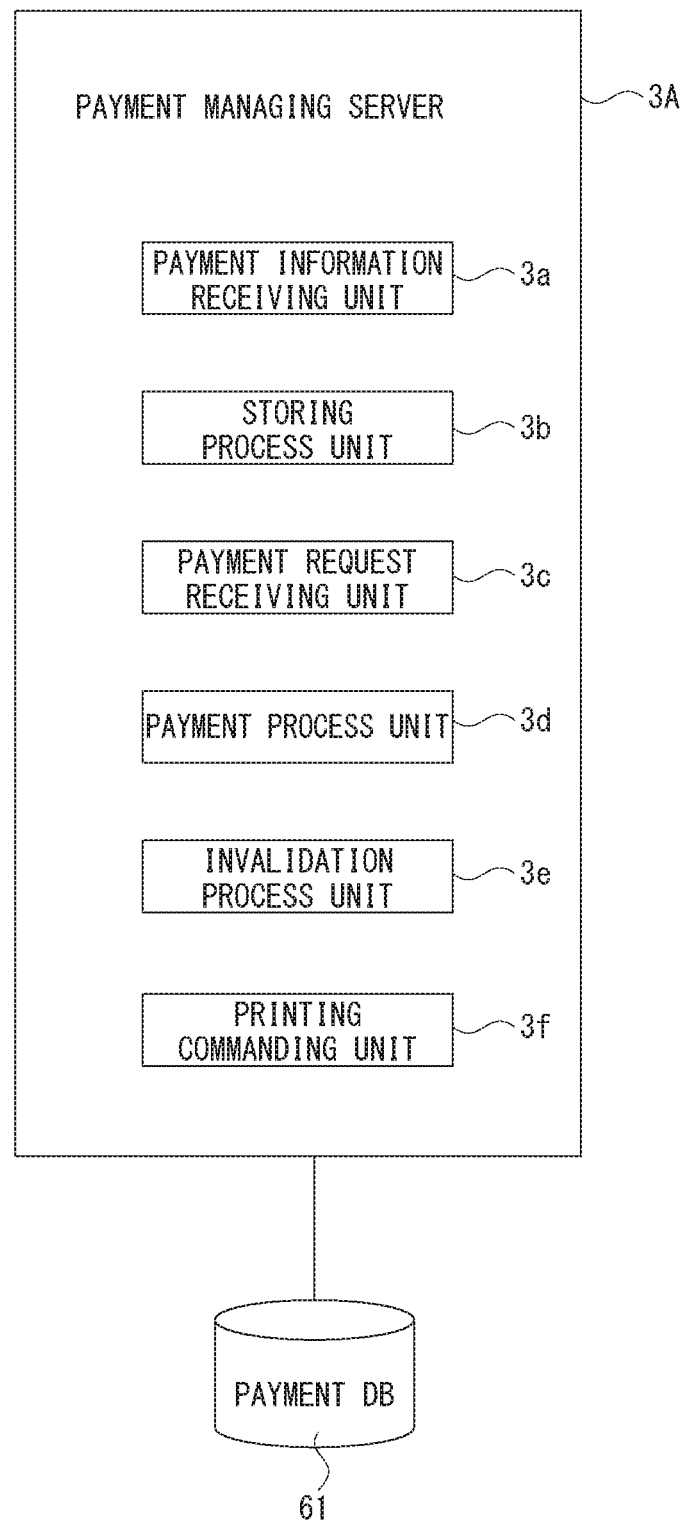
FIG. 16 is a diagram for describing the functional structure of a payment managing server according to the second embodiment.

As illustrated in FIG. 16, the payment managing server 3A according to the second embodiment includes a payment information receiving unit 3a, a storing process unit 3b, a payment request receiving unit 3c, a payment process unit 3d, an invalidation process unit 3e, and a printing commanding unit 3f. That is, a feature is that the printing commanding unit 3f is provided in comparison with the payment managing server 3 according to the first embodiment.

That is, the printing of the code information on the print medium is executed by the payment managing server 3A that transmits the printing request to the shop server 1A or the payment managing server 3A that transmits the printing request to a printer that is managed at the shop.

Moreover, the process of invalidating the payment information is executed by the payment managing server 3A which has received the new payment information and which identifies the old payment information not subjected to the payment. Execution of this process is enabled without receiving the invalidation command from the shop server 1A.

<6-1. Flow Relating to First Order According to Second Embodiment>

Figure 17:
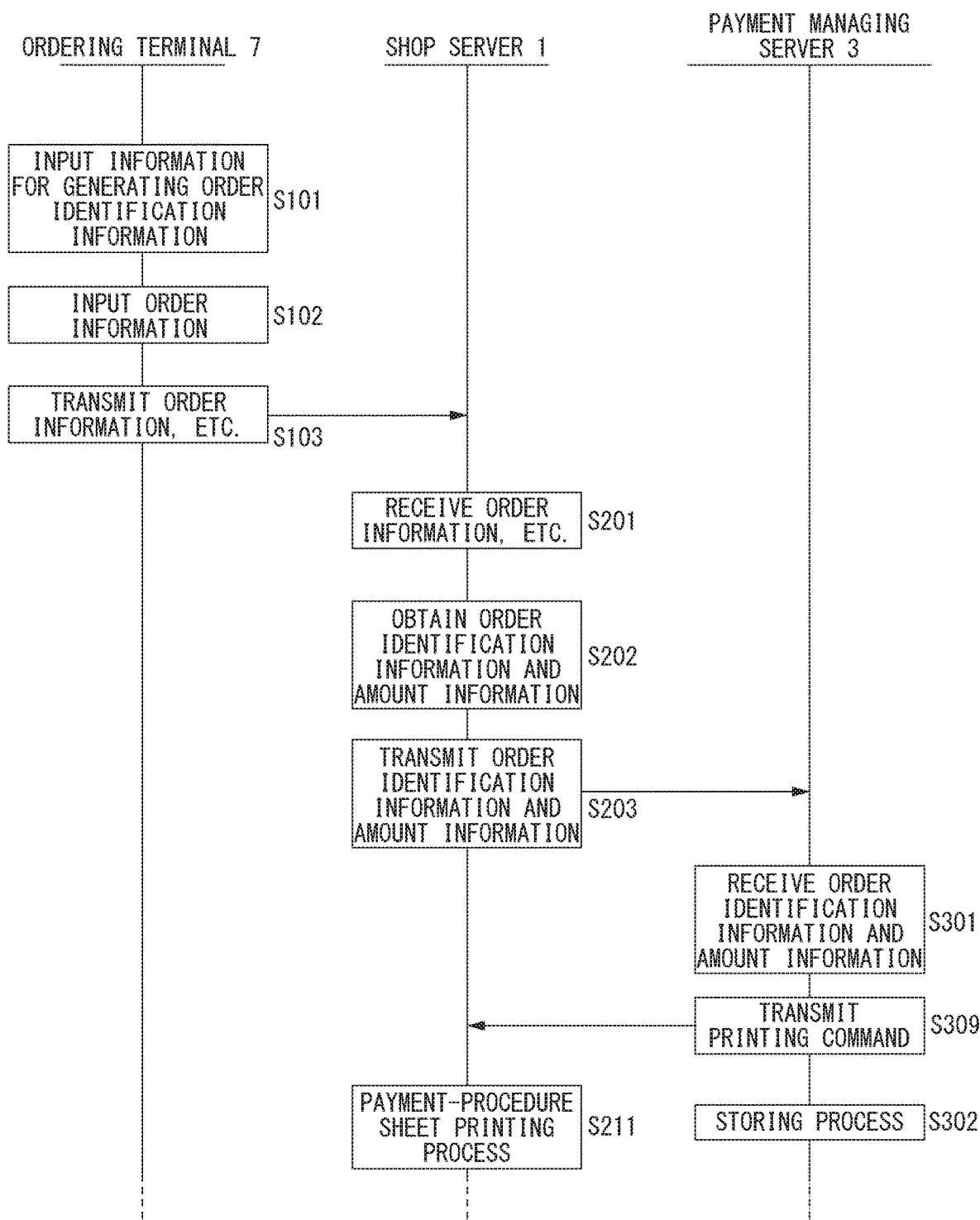
FIG. 17 is a diagram for describing respective processes executed by respective terminal and server when an order-placing person initially places an order according to the second embodiment.

An outline of the flow of the process by each information processing device relating to the first order according to the second embodiment will be described with reference to FIG. 17.

When the guest who visits the shop is directed to a table, the shop assistance inputs information for generating the order identification information using the ordering terminal 7, and also inputs the order information, in response to this event, the ordering terminal 7 executes the processes in step S101 and in step S102, and executes the transmitting process of the order information, etc., in step S103.

The shop server 1A that has received the order information, etc., (step S201) obtains, in step S202, the order identification information and the information on the amount of money for order, and transmits, in step S203, the order identification information and the amount information.

After receiving the order identification information and the amount information (step S301), the payment managing server 3A executes, in step S309, a process of transmitting the printing command to the shop server 1A, and then executes, in step S302, a storing process of the order identification information and the amount information.

The shop server 1A that has received the printing command executes, in step S211, a printing process of the payment-procedure sheet. This process is that, for example, the shop server 1A transmits the printing command to the printer, etc.

That is, unlike the first embodiment, the shop server 1A executes the printing process of the payment-procedure sheet by receiving the printing command from the payment managing server 3A.

Note that either the process in step S309 or the process in step S302 may be executed at first.

Moreover, in the process in step S309, the payment managing server 3A may accomplish the printing of the payment-procedure sheet by transmitting the printing command to an information processing device other than the shop server 1A that belongs to the network that is managed by the shop.

<6-2. Flow of Additional Order According to Second Embodiment>

Figure 18:
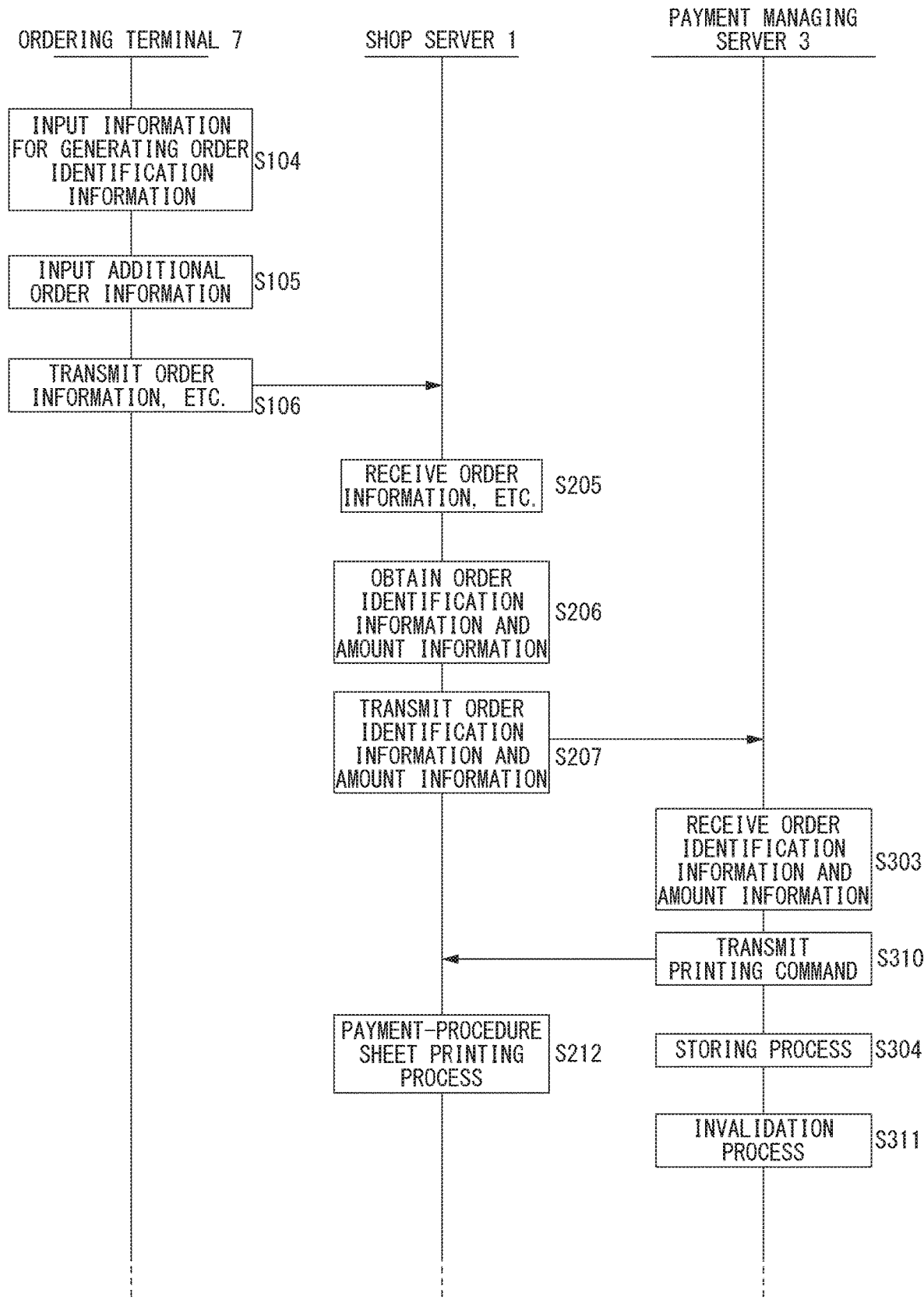
FIG. 18 is a diagram for describing respective processes executed by respective terminal and server when the order-placing person places an additional order according to the second embodiment.

An outline of the flow of the process by each information processing device relating to an additional order according to the second embodiment will be described with reference to FIG. 18.

When the shop assistance inputs various kinds of information relating to the additional order using the ordering terminal 7, in response to this event, the ordering terminal 7 executes the respective processes in step S104, step S105, and step S106.

The shop server 1A that has received the order information, etc., (step S205) obtains, in step S206, the order identification information and the information on the amount of money for order, and transmits, in step S207, the order identification information and the amount information.

The payment managing server 3 that has received the order identification information and the amount information (step S303) executes, in step S310, a process of transmitting the printing command to the shop server 1A, and then executes, in step S304, a storing process of the order identification information and the amount information.

The shop server 1A that has received the printing command executes, in step S212, the printing process of the payment-procedure sheet.

The payment managing server 3A executes, in step S311, the invalidation process.

The invalidation process is executed using, for example, the order identification information. More specifically, a process of searching for the order placed in past by the same order-placing person from the service DB 61 and of invalidating the corresponding record is executed. That is, among the respective records stored in the payment DB 61, the record that has the same order-placing person identification information as the order-placing person identification information contained in the order information received in step S205, i.e., the record that contains the order-placing person identification information that contains the same shop code, the same table code, and the same guest code is identified as the information subjected to the invalidation. Moreover, the payment managing server 3A executes a process of setting the validation flag of the identified target record to be "False".

Note that in this invalidation process, even if the record has the same order-placing person identification information, the record which is handled as already paid, i.e., the record that has the already-paid flag set to "True" is not subjected to the invalidation. Needless to say, regardless of the already-paid flag, the validation flag of the corresponding record may be set to "False".

In the invalidation process according to the second embodiment, unlike the first embodiment, the payment managing server 3A executes the invalidation process without receiving the invalidation command from the shop server 1A. That is, since the information transmission and reception between the shop server 1A and the payment managing server 3A are eliminated, reduction of the process loads on both the information processing devices can be accomplished.

Note that the flow relating to the payment according to the second embodiment is similar to the flow according to the first embodiment as illustrated in FIG. 7, and thus the illustration and the description will be omitted.

<7. Respective Processes According to Second Embodiment>

In order to achieve the flows of the processes by the respective devices as described with reference to respective figures that are FIG. 17, FIG. 18, and FIG. 7, example processes executed by the shop server 1A, the payment managing server 3A, and the user terminal 4 will be described with reference to the accompanying figures.

<7-1. Order Information Receiving Process According to Second Embodiment>

Figure 19:
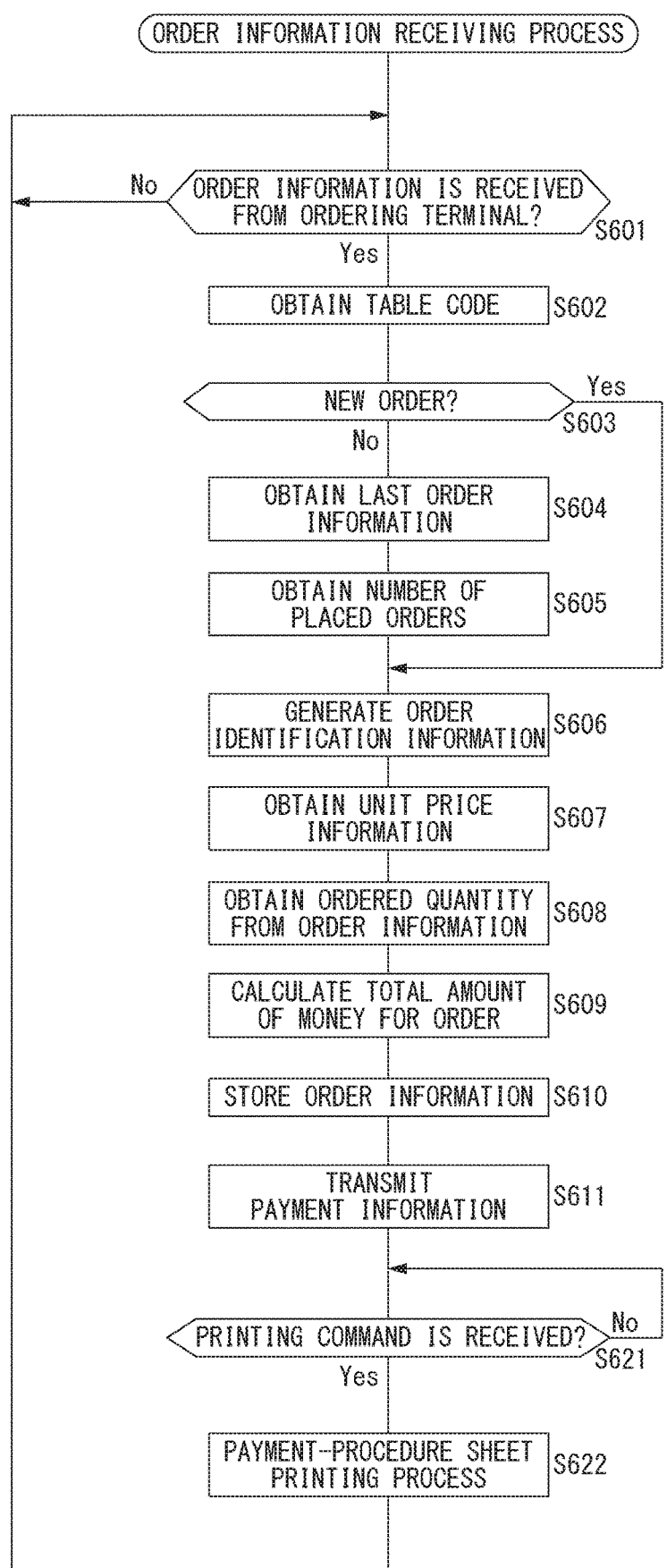
FIG. 19 is a flowchart illustrating an example order information receiving process according to the second embodiment.

An example order information receiving process according to the second embodiment will be described with reference to FIG. 19. Note that the similar process to the order information receiving process (FIG. 8) according to the first embodiment will be denoted by the same reference numeral, and the description thereof will be omitted as appropriate.

The shop server 1A determines, in step S601, whether or not the order information is received from the ordering terminal 7, and executes, when received, respective processes from step S602 to step S606 to generate the order identification information.

Moreover, execution of the respective processes from step S607 to step S609 by the shop server 1A causes the amount of money (total amount of money for order) relating to the order information received at this time to be calculated.

Furthermore, the shop server 1A executes, in step S610, a storing process of the order information, and executes, in step S611, a process of transmitting the payment information to the payment managing server 3A.

Next, the shop server 1A determines, in step S621, whether or not the printing command is received from the payment managing server 3A instead of giving a command to the printer to print the payment-procedure sheet. The shop server 1A stands by in step S621 until receiving the printing command.

The shop server 1A that has confirmed the reception of the printing command executes, in step S622, a printing process of the payment-procedure sheet. In this process, for example, the printing command is transmitted to the printer.

Since the shop server 1A stands by until receiving the printing command from the payment managing server 3A, the printing process is executed after the payment managing server 3A normally receives the order identification information and the amount information. Hence, a trouble such that, when the payment process is executed using the user terminal 4, the payment managing server 3A has not received the order information, and thus the payment process is inexecutable is avoidable, thereby surely accomplishing the execution of the payment process.

<7-2. Payment Information Receiving Process>

Figure 20:
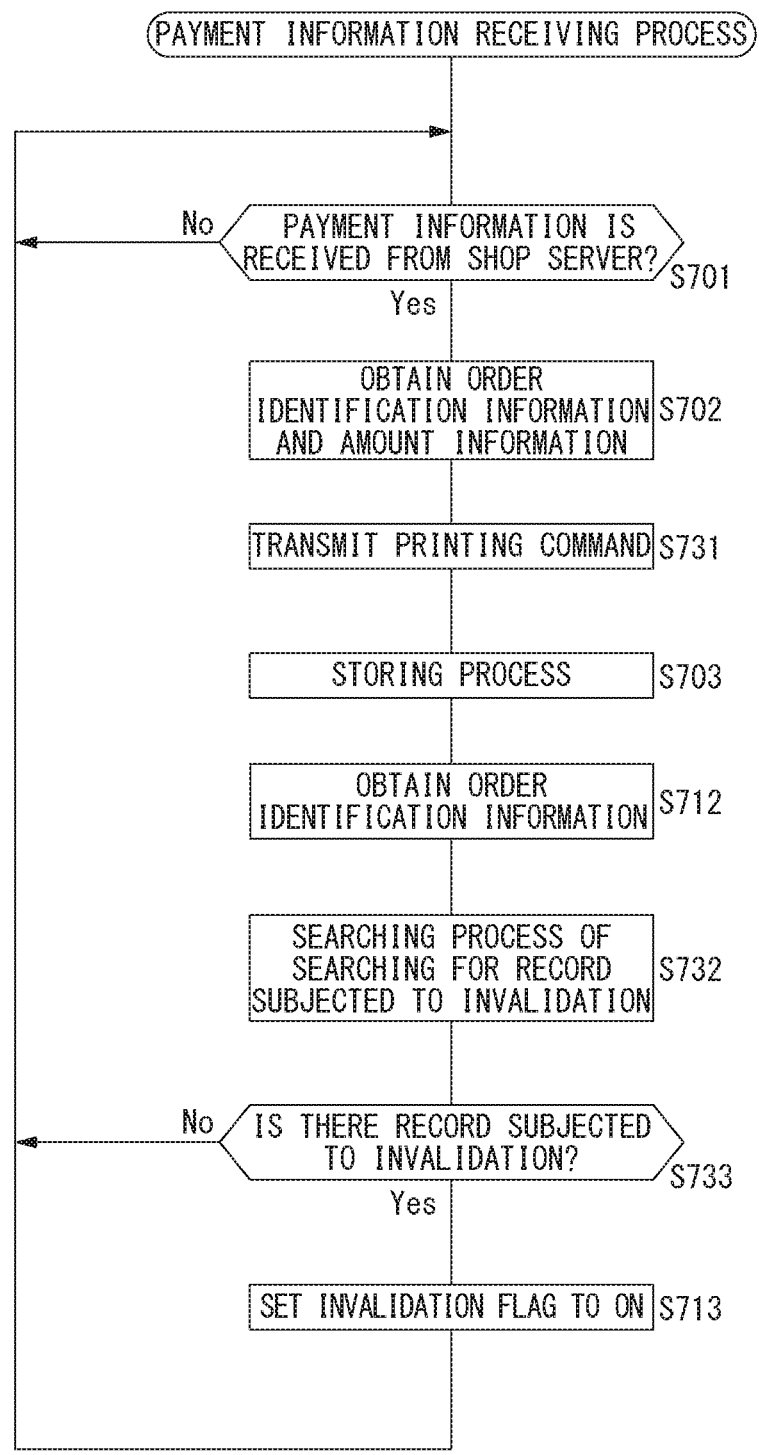
FIG. 20 is a flowchart illustrating an example payment information receiving process according to the second embodiment.

An example payment information receiving process according to the second embodiment will be described with reference to FIG. 20. Note that respective processes executed in the payment information receiving process according to the second embodiment correspond to the respective processes executed in the payment information receiving process (FIG. 10) and the invalidation command receiving process (FIG. 12) according to the first embodiment.

The payment managing server 3A checks, in step S701, the reception of the payment information, obtains, in step S702, the order identification information and the amount information, and executes, in step S703, a storing process.

The payment managing server 3A executes, in step S731, a process of transmitting the printing command to the shop server 1A. This process may be a transmitting process to an information processing device other than the shop server 1A that belongs to the network that is managed by the shop as described above.

Subsequently, the payment managing server 3A obtains, in step S712, the order identification information, and executes, in step S732, a process of searching for the record subjected to the invalidation. In this searching process, the order identification information obtained in step S712 (or the order-placing person identification information contained in the order identification information) is utilized.

The payment managing server 3A determines, in step S733, whether or not the record subjected to the invalidation is found.

When the record subjected to the invalidation is found, the payment managing server 3A sets, in step S713, the invalidation flag for the target record to "ON". This may be accomplished by setting the validation flag to "False" as described above.

Conversely, when the record subjected to the invalidation is not found, the payment managing server 3A executes the process in step S701 again.

<8. Outline of Flow According to Third Embodiment>

In comparison with the above-described first embodiment and second embodiment, according to a third embodiment, the information to be transmitted in step S203 in FIG. 5 from the shop server 1 to the payment managing server 3 in response to the order placed by the order-placing person is different. More specifically, although the order identification information and the amount information are transmitted in the first embodiment and in the second embodiment, according to the third embodiment, what is different is that the amount information is not transmitted.

The specific flow of the process will be described with reference to FIG. 21.

Since the similar processes to those of the other embodiments are executed until the shop server 1 receives the order information from the ordering terminal 7, i.e., until the process in step S201 is executed, the description will be omitted.

The shop server 1 that has received the order information, etc., in accordance with the order placed by the order-placing person executes, in step S213, a process of obtaining the order identification information from the received information, and executes, in subsequent step S214, a process of transmitting the order identification information to the payment managing server 3. That is, the amount information is not transmitted at this stage.

In response to this event, the payment managing server 3 receives, in step S312, the order identification information, and executes, in step S302, a storing process of the order identification information.

Hence, the information that can identify the order placed by the order-placing person is stored.

Figure 21:
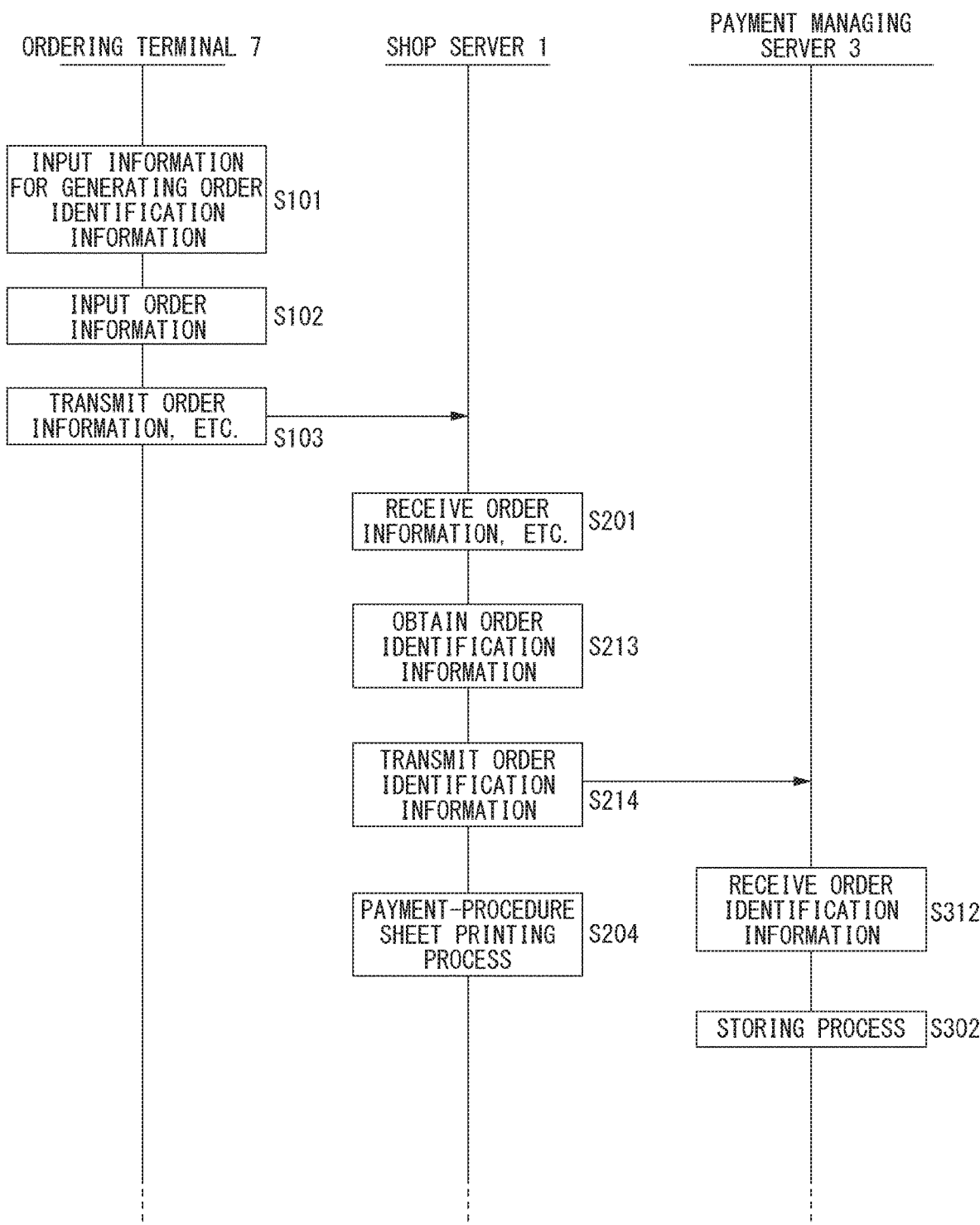
FIG. 21 is a diagram for describing respective processes executed by respective terminal and server when an order-placing person initially places an order according to a third embodiment.

Since the respective processes in FIG. 6 to be executed when the order-placing person places an additional order are the similar processes to those as illustrated in FIG. 21, the description thereof will be omitted. Note that the invalidation process in step S305 is a process of invalidating the corresponding order identification information using the flag, etc.

Next, several examples will be described when the order-placing person makes a payment with respect to the placed order using the user terminal 4.

The first example will be described with reference to FIG. 7.

The user terminal 4 executes the processes from step S501 to step S503, thereby executing a reception of a code information reading operation, a reading process, and a payment method selecting process. Next, the user terminal 4 executes, in step S504, a payment request transmitting process.

According to this embodiment, the payment managing server 3 is not managing the amount of money for order. That is, at a time point at which the process in step S504 is executed, the payment managing server 3 does not grasp the amount of money for order that can be identified by the order identification information.

Hence, in the payment request transmitting process in step S504, in addition to the information that can identify the order identification information and the payment method, the amount of money to be paid is transmitted from the user terminal 4. That is, the code information read by the user terminal 4 contains the order identification information and the payment amount information.

The payment managing server 3 executes, in step S306, a payment request receiving process, and executes, in step S307, a payment process. Through such process, the amount information received from the user terminal 4 is transmitted to the card company system 5, and the payment is completed.

Figure 22:
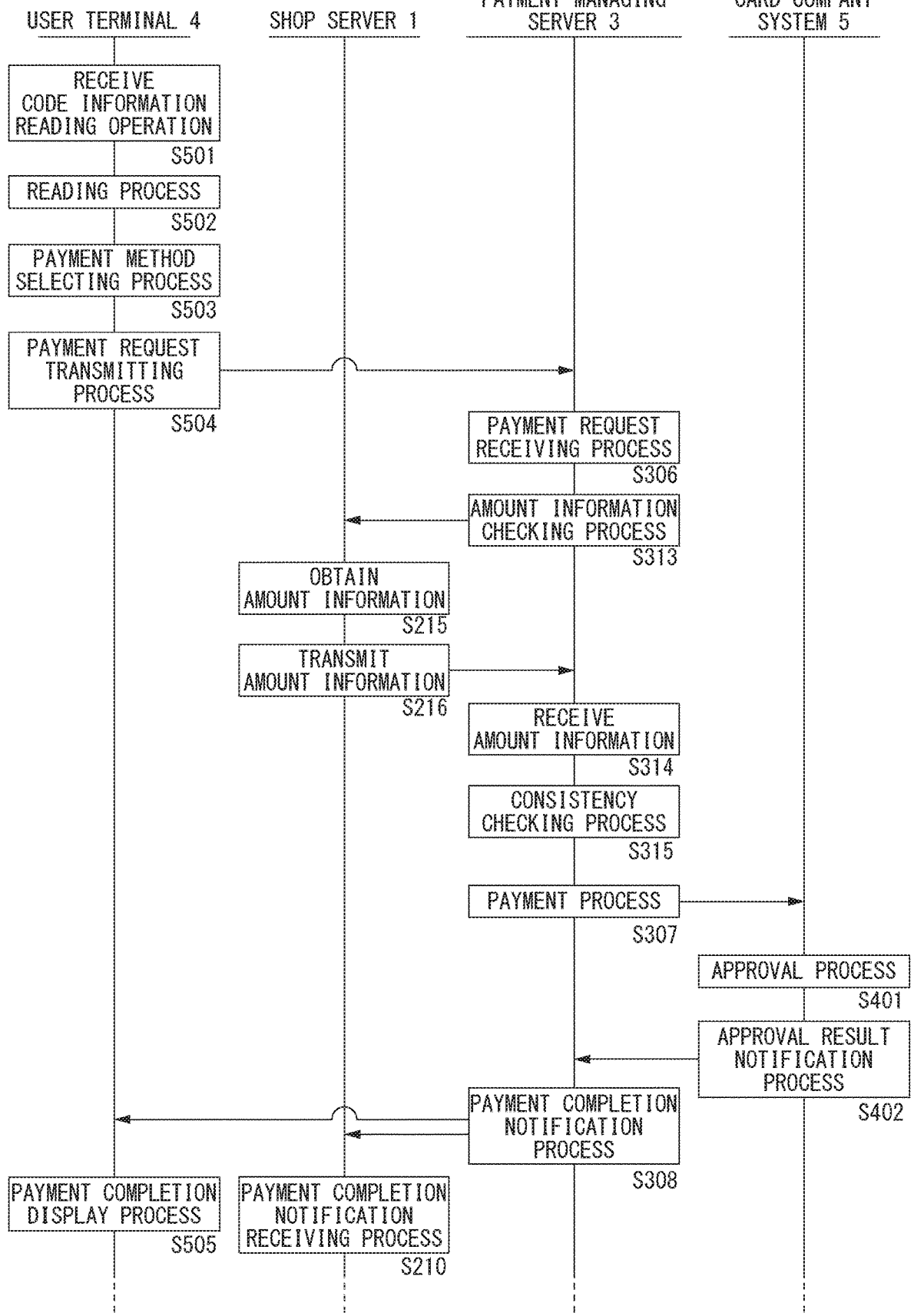
FIG. 22 is a diagram for describing respective processes executed by respective terminal and server when the order-placing person makes a payment with respect to the order according to the third embodiment.

The second example will be described with reference to FIG. 22.

According to this example, the amount information is received from the user terminal 4, and the amount information is also received from the shop server 1 to check up the consistency of the amount of money.

By executing the respective processes in step S501 to step S504 by the user terminal 4, the payment request that contains the amount information is transmitted.

After receiving the payment request in step S306, the payment managing server 3 executes, in step S313, an amount information checking process. This process is to request the amount information associated with the order identification information, i.e., the information on the amount of money to be paid by the order-placing person by transmitting the order identification information to the shop server 1.

The shop server 1 that has received the request obtains, in step S215, the amount information associated with the order identification information, and executes, in step S216, a process of transmitting the amount information to the payment managing server 3.

The payment managing server 3 receives, in step S314, the amount information, and executes, in step S315, a consistency checking process. In the consistency checking process, whether or not the amount information received from the user terminal 4 is consistent with the amount information received from the shop server 1 is checked up.

After executing the consistency checking process, the payment managing server 3 executes, in step S307, a payment process. Each process to be executed by each information processing device subsequently is the similar process to that as described above, and thus the description will be omitted.

The third example will be described with reference to FIG. 22.

According to this example, no amount information is received from the user terminal 4. However, the amount information is instead received from the shop server 1.

By executing the respective processes from step S501 to step S504 by the user terminal 4, a payment request that contains no amount information is transmitted.

After receiving the payment request in step S306, the payment managing server 3 executes, in step S313, an amount information checking process. This process is to request the amount information associated with the order identification information, i.e., the information on the amount of money to be paid by the order-placing person by transmitting the order identification information to the shop server 1.

The shop server 1 that has received the request obtains, in step S215, the amount information associated with the order identification information, and executes, in step S216, a process of transmitting the amount information to the payment managing server 3.

After receiving the amount information in step S314, the payment managing server 3 executes, in step S307, a payment process without executing a process in step S315. Respective processes to be executed by the respective information processing device subsequently are the similar processes to those as described above, and thus the description thereof will be omitted.

<9. Each Process According to Third Embodiment>

In order to accomplish the flows of processes by respective devices as described with reference to FIGS. 21, 6, and 22, examples processes executed by the shop server 1 (1A) and by the payment managing server 3 (3A) will be described with reference to the accompanying figures.

<9-1. Order Information Receiving Process>

An order information receiving process executed by the shop terminal 1 will be described with reference to FIG. 8. Note that respective processes from step S601 to step S606 are the similar processes to those in the other embodiments, and thus the description thereof will be omitted.

Respective processes from step S607 to step S609 are to calculate the total amount of money for order. According to this embodiment, since it is not necessary to transmit the total amount of money for order from the shop terminal 1 to the payment managing server 3, in a payment information transmitting process in step S611, only order identification information may be transmitted. Accordingly, the process in step S611 may be executed immediately after the process in step S606.

The same is true of the order information receiving process (see FIG. 19) executed by the shop terminal 1A. That is, in the payment information transmitting process in step S611 in FIG. 19, no total amount of money for order is transmitted.

Hence, according to this embodiment, since the information quantity to be transmitted from the shop terminal 1 to the payment managing server 3 is minimized, reduction of communication costs can be accomplished. In particular, in the case of the order-placing person who places additional orders repeatedly, the total amount of money which is to be invalidated and which is not referred anymore may be repeatedly transmitted to the payment managing server 3. In this case, only the total amount of money for order that is transmitted by the last order will be referred. According to this embodiment, such a waste information transmission is suppressed.

<9-2. Payment Information Receiving Process>

A payment information receiving process executed by the shop terminal 1 will be described with reference to FIG. 10.

The process in step S702 differs from that of the first embodiment as described with reference to FIG. 10. More specifically, since the received information contains no amount information, the order identification information is obtained, but the amount information is not obtained. Hence, only the order identification information is stored in a storing process in step S703.

A payment information receiving process executed by the shop terminal 1A will be described with reference to FIG. 20.

In this case, also, the process in step S702 and the process in step S703 likewise differ.

Moreover, in a printing command transmitting process in step S731, since the payment managing server 3 does not have the amount information, the printing command is given to the shop server 1A by specifying the order identification information. The shop server 1A identifies the amount information based on the received order identification information, and prints the payment-procedure sheet that contains this information.

As described above, according to this embodiment, only the order identification information is the information stored by the payment managing server 3 in response to the payment information receiving process, an applied storage area can be made compact, contributing to cost reduction.

<9-3. Payment Request Receiving Process>

A payment request receiving process executed by the payment managing server 3 will be described with reference to FIG. 14. Note that the successive processes illustrated in FIG. 14 (or successive processes illustrated in FIGS. 23 and 24 to be described later) may be processes executed by the payment managing server 3A.

Note that the respective processes from step S721 to step S724 are the similar processes to those in the other embodiments, and thus the description thereof will be omitted.

The payment managing server 3 that has obtained the credit card information obtains the information on the usage amount. More specifically, the payment managing server 3 executes, in step S725, a process of extracting usage amount information from the information received in step S721. That is, in the previous example, although the information is obtained from the DB that is managed by the payment managing server 3, according to this embodiment, the usage amount information is extracted from the information received from the user terminal 4.

According to this example, the payment process (i.e., the successive processes illustrated in FIG. 14) is executed using the amount information obtained from the user terminal 4. That is, since the amount information is not obtained from the shop server 1, information transmitting and receiving processes executed between the shop server 1 and the payment managing server 3 are reduced, and thus reduction of a process load and reduction of a communication quantity can be accomplished.

Figure 23:
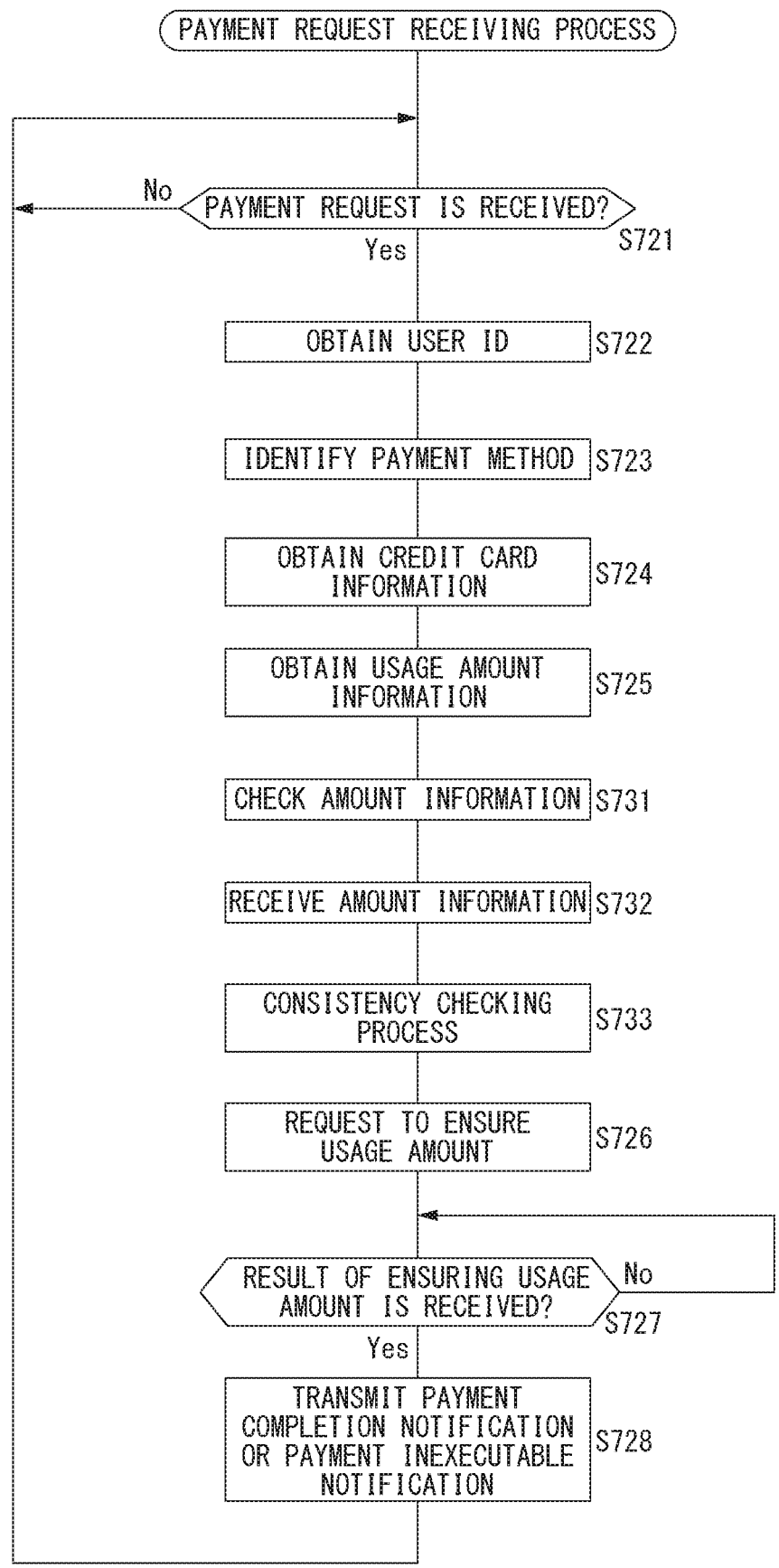
FIG. 23 is a flowchart illustrating an example payment request receiving process according to the third embodiment.

Another example payment request receiving process executed by the payment managing server 3 will be described with reference to FIG. 23.

The payment managing server 3 executes, in step S725, a process of extracting the usage amount information from the information received in step S721. Next, the payment managing server 3 executes, in step S731, the amount information checking process. This process is the process in step S313 in FIG. 22, i.e., a process of requesting the shop server 1 to transmit the amount information. The order identification information is transmitted to the shop server 1 through this process.

The payment managing server 3 receives, in step S732, the amount information from the shop server 1.

The payment managing server 3 executes, in step S733, a consistency checking process. This process is to determine whether or not the usage amount information received from the user terminal 4 is consistent with the amount information received from the shop server 1.

When the two pieces of amount information differ from each other, the payment managing server 3 gives, to the user terminal 4 and to the shop server 1, a notification that the payment cannot be made.

When the two pieces of amount information are consistent with each other, the payment managing server 3 executes respective processes from step S726 to step S728. Accordingly, the payment by the order-placing person using the user terminal 4 is completed.

According to this example, by checking the consistency using the two pieces of amount information, a disadvantageous such that an incorrect amount of money is paid is prevented. That is, the payment process is executed using the proper amount information.

Note that when the two pieces of amount information differ from each other, the payment method obtained in step S723 and the credit card information obtained in step S724, etc., are not to be utilized.

Hence the respective processes in step S725, step S731, step S732, and step S733 may be executed immediately after the process in step S722 is executed. This eliminates, when the two pieces of amount information differ from each other, a necessity to execute an obtaining process of the information (the payment method and credit card information) which is not to be utilized, and thus a process load can be reduced.

Figure 24:
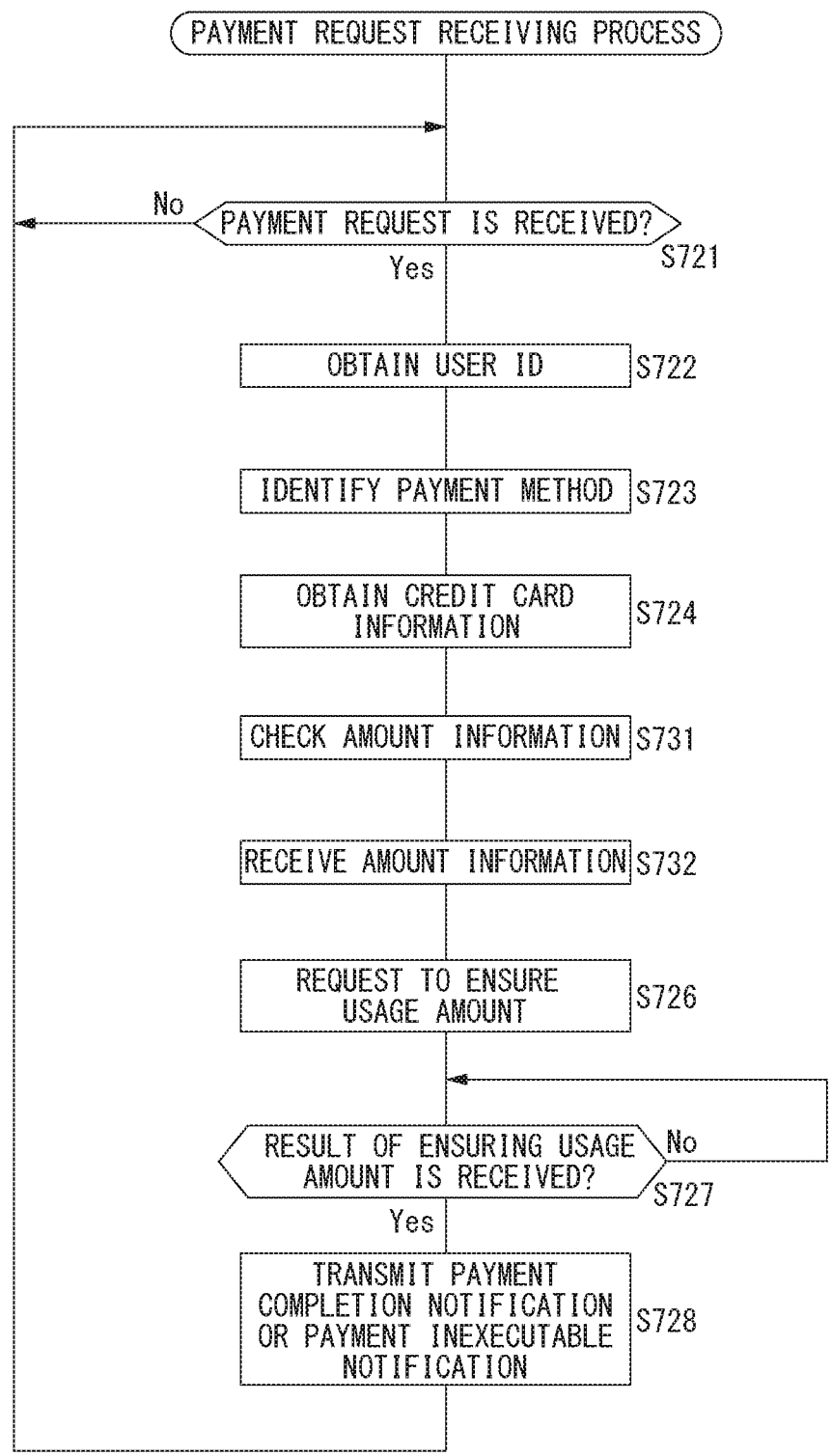
FIG. 24 is a flowchart illustrating another example payment request receiving process according to the third embodiment.

A further another example payment request receiving process executed by the payment managing server 3 will be described with reference to FIG. 24.

After executing the respective processes from step S721 to step S724, the payment managing server 3 executes, in step S731, the amount information checking process. This process causes a request for the amount information to be transmitted to the shop server 1.

When the shop server 1 transmits the amount information, the payment managing server 3 executes, in step S732, a receiving process of the amount information.

The payment managing server 3 requests, in step S726, to ensure the usage amount. The description on the subsequent processes will be omitted.

According to this example, the payment managing server 3 does not have the amount information, but initially obtains such information when receiving the payment request.

Moreover, the obtainment of the amount information is executed from the shop server 1, and such information is not contained in the information received from the user terminal 4.

That is, since the transmission and reception of the amount information are minimized as needed, communication costs can be reduced (i.e., reduction of a communication traffic, reduction of a process load inherent to the communication process, and reduction of fees for communication, etc., are accomplished).

<10. Summary>

As described with reference to the above-described respective examples, the information processing device as the shop server 1 includes the information obtaining unit 1*a* that obtains the order identification information capable of identifying the order placed by the order-placing person, the transmitting unit 1*b* that transmits, as the payment information, the order identification information (in addition to such information, the amount information on the amount of money for the order may be contained), the printing control unit 1*c* that causes the printing process of a print medium to be executed, the print medium being capable of identifying the order identification information, and the invalidation commanding unit 1*d* that gives, to another information processing device (the payment managing server 3) when an additional order placed by the order-placing person is received, the invalidation command which invalidates the order identification information in such a way that the payment with respect to the order identification information on an order not paid yet and placed by the same order-placing person is disabled.

The order identification information is information that can uniquely identify the order placed by the order-placing person. That is, identification of the order is enabled by transmitting and receiving the order identification information without transmitting and receiving the information on an ordered item (commodity) one by one. Hence, by transmitting and receiving, for example, as the information transmitted when the payment is made, the order identification information, the transmission and reception of the information for each item become unnecessary, contributing to the reduction of the process load on the information processing device (including the payment managing server 3 and the shop server 1), and to the efficient utilization of a communication bandwidth.

Moreover, by preliminarily transmitting, as the payment information, the order identification information (that may contain the amount information (the total amount of money for order)) to another information processing device (the payment managing server 3) that executes the payment process, when the payment process is executed, the payment process can be executed by simply transmitting the order identification information. This enables reduction of a time necessary for the payment managing server 3 to execute the payment process. In particular, according to the above-described respective examples, since the user terminal 4 utilized by the order-placing person transmits the order identification information when the payment process is executed, a process load on the shop server 1 when the payment process is executed is remarkably reduced.

Furthermore, when the additional order placed by the order-placing person is received, by giving the invalidation command for invalidating the payment information that has been transmitted to the payment managing server 3 so far, only the latest payment information is validated when there are plural pieces of payment information not paid yet and placed by the same order-placing person. Since the data handled when the payment process is executed becomes only the latest payment information, a necessary time for the payment process can be reduced, and thus a process load on the payment managing server 3 can be reduced.

Note that by giving the printing command of a print medium that can identify the order identification information, the different terminal, e.g., the order-placing person terminal like a mobile phone utilized by the order-placing person (the user terminal 4) from the information processing device (the shop server 1) becomes able to read the order identification information. This enables the order-placing person terminal (the user terminal 4) to request the payment based on the read order identification information. That is, it becomes unnecessary for the information processing device (the shop server 1) to execute the process of transmitting the payment request, a process load on the information processing device (the shop server 1) can be reduced. In particular, when there is a plurality of order-placing persons, and the plurality of order-placing persons attempts to make the payment at the same time, transmission of each payment request may overlap. When the payment request is transmitted by the single terminal (the shop server 1), a process load may increase and the transmitting process of the payment request may be delayed. According to this structure, however, by enabling the transmitting process of the payment request using another terminal like the order-placing person terminal (the user terminal 4), the transmitting process of the payment request can be distributed, thereby avoiding a concentration of the process load on the single terminal (the shop server 1) and enabling an efficient process execution. Moreover, this can avoid an occasion in which the order-placing person needs to stand in line for payment procedure, thus wasting a time.

Note that in the above-described respective examples, a sequence from reception of the order and to payment is enabled without an information communication between the shop server 1 and the user terminal 4. That is, in the shop server 1, since it is unnecessary to load a process for receiving information that is transmitted from the various user terminals 4, the costs for constructing the shop server 1 can be reduced. Moreover, since the process load on the shop server 1 is reduced, the requisite performance of the shop server 1 can be reduced, contributing to the cost reduction of shop server 1. Furthermore, since it is not necessary to have the information on a large number of user terminals 4, reduction of a DB that is managed by the shop server 1 and reduction of a storing unit of the shop server 1 are accomplished.

Note that the above actions and effects can be also achieved by utilizing an information processing device (the payment managing server 3A) that includes a receiving unit (the payment information receiving unit 3a) that receives, as the payment information, the order identification information (that may also contain the amount information as the amount of money to be paid for the order) capable of identifying the order placed by the order-placing person, a printing control unit (the printing commanding unit 3f) that causes the printing process of a print medium to be executed, the print medium being capable of identifying the order identification information, and the invalidation process unit 3e that executes, when an additional order placed by the order-placing person is received, the invalidation process of invalidating the order identification information in such a way that the payment with respect to the order identification information on an order not paid yet and placed by the same order-placing person is disabled.

Like the description on the functional structure, and the description with reference to FIGS. 9A and 9B, the order identification information handled by the information processing device as the shop server 1 may contain the order-placing person identification information that distinguishes the order-placing person.

When the order identification information contains the information that can identify the order-placing person, a determination is enabled on whether or not it is the order by the same order-placing person simply by analyzing order identification information.

This facilitates identification of the payment information by the same order-placing person and to be invalidated upon the invalidation command, and thus a process load can be reduced.

Like the description on the functional structure, and the description with reference to FIGS. 9A and 9B, the order-placing person identification information handled by the information processing device as the shop server 1 may contain the information capable of identifying the shop at which the order is received.

When the information that can identify a customer also contains the information that can identify the shop, customer identifying information becomes information that is different shop by shop.

That is, since there is no redundant customer identifying information transmitted from each of the plurality of shops, it becomes unnecessity to provide the payment managing server 3 that is different shop by shop, and thus reduction of the process load and reduction of system installation costs are accomplished.

Moreover, the order-placing person identification information may contain no personal information on the order-placing person. For example, the order-placing person identification information may contain the shop code that indicates the shop where the order is placed, the table code that indicates the table utilized by the order-placing person, and a guest code that indicates the sequence of the usage of the table. Accordingly, since the order-placing person identification information does not contain the personal information on the order-placing person, from the standpoint of the personal information protection, the convenience when the order identification information is handled is high.

Like the description on the function of the printing control unit 1c, the printing process executed by the information processing device as the shop server 1 may be a process of printing the code information (e.g., two-dimensional bar code) capable of identifying the order identification information on the print medium.

This enables utilization of one-dimensional bar code and two-dimensional bar code that are universally prevalent as the code information.

That is, since the conventional technologies are applicable to this structure, development costs etc., can be reduced.

Like the description with reference to FIG. 7 etc., the information processing device as the shop server 1 may include the receiving unit 1e that receives, as the payment completion notification, the payment completion notification as a notification indicating that a payment has been completed from another information processing device (the payment managing server 3).

By receiving the payment completion notification, a determination on whether or not the order-placing person has paid is enabled.

This prevents a fraudulent activity like not paying money. Moreover, since the checking process on whether or not the payment has been made can be simplified, reduction of process loads on the information processing device (the shop server 1) and on an operator (the shop assistance) is accomplished.

As described with reference to FIGS. 6 and 7 regarding the flow for payment, according to the information processing device as the shop server 1, when, after the payment completion notification for the order placed by the order-placing person is received, the additional order placed by the same order-placing person is received, the transmitting unit 1e may transmit, as the amount information, the information on the total amount of money for the additional order which is placed after the payment completion notification is received and which is not paid yet. In this case, however, the payment information should contain the amount information on the amount of money to be paid for the order.

That is, the notification from which the amount of money for order that has been already paid is removed is given to another information processing device (e.g., the payment managing server 3).

Since it becomes unnecessary to execute a process of, for example, subtracting the amount of money for order that has been already paid at the payment managing server 3, reduction of the process load on the payment managing server 3 is accomplished. When, in particular, the payment information is received from a large number of shops, a large number of pieces of information may be received at once. In such a case, the process ability of the payment managing server 3 may become a bottleneck, but according to this structure, since a load on the payment managing server 3 inherent to the payment information receiving process and to the storing process can be reduced, processes can be executed smoothly. Moreover, requests from a further large number of shops become processable. Furthermore, an inexpensive computer apparatus that has a suppressed process ability can be adopted as the payment managing server 3. Hence, system costs can be reduced.

Moreover, the information processing device as the payment managing server 3 includes the payment information receiving unit 3a that receives, as the payment information, the order identification information (that may contain the amount information) capable of identifying the order placed by the order-placing person, the storing process unit 3b that causes the storing process of the received payment information to be executed, the payment request receiving unit 3c that receives the payment request from the order-placing person terminal (the user terminal 4) utilized by the order-placing person, the payment request containing the order identification information and the paying information on the order-placing person (e.g., the information that identifies the payment method), the payment process unit 3d that executes, based on the payment request, the payment process on the payment information, and the invalidation process unit 3e which receives, when the additional order placed by the order-placing person is received, the invalidation command which invalidates the order identification information in such a way that the payment with respect to the order identification information not paid yet and placed by the same order-placing person is disabled, and which invalidates the stored payment information.

By the invalidation process of the invalidation process unit 3e, only the payment information that contains the latest order identification information is validated, thereby preventing a redundant payment.

Moreover, in the payment system that includes the shop server 1 and the payment managing server 3, an information processing device that is either the shop server 1 or the payment managing server 3 includes the information obtaining unit 1a that obtains the order identification information capable of identifying the order placed by the order-placing person, the transmitting unit 1b that transmits, as the payment information, the order identification information (which may contain the amount information), the printing control unit 1c (or the printing commanding unit 30 that causes the printing process of a print medium to be executed, the print medium being capable of identifying the order identification information, the invalidation commanding unit 1d that gives, to another information processing device (the payment managing server 3) when the additional order placed by the order-placing person is received, the invalidation command which invalidates the order identification information in such a way that the payment with respect to the order identification information not paid yet and placed by the same order-placing person is disabled, the payment information receiving unit 3a that receives the payment information, the storing process unit 3b that causes the storing process of the received payment information to be executed, the payment request receiving unit 3c that receives the payment request from the order-placing person terminal (the user terminal 4) utilized by the order-placing person, the payment request containing the order identification information and the paying information on the order-placing person, the payment process unit 3d that executes, based on the payment request, the payment process on the payment information, and the invalidation process unit 3e which receives the invalidation command from the invalidation commanding unit, and which invalidates the stored payment information.

This enables construction of a system that can accomplish the above-described various effects.

Moreover, the above-described payment system may include the information obtaining unit 1a that obtains the order identification information capable of identifying the order placed by the order-placing person, the transmitting unit 1b that transmits, as the payment information, the order identification information (which may contain the amount information as the amount of money for the order to be paid), the payment information receiving unit 3c that receives the payment information, the storing process unit 3b that causes the storing process of the received payment information to be executed, the printing control unit (the printing control unit 1c or the printing commanding unit 30 that causes the printing process of the print medium to be executed, the print medium being capable of identifying the order identification information, the invalidation process unit 3e that executes, when the additional order placed by the order-placing person is received, the invalidation process of invalidating the order identification information in such a way that the payment with respect to the order identification information not paid yet and placed by the same order-placing person is disabled, the payment request receiving unit 3c that receives the payment request from the order-placing person terminal utilized by the order-placing person, the payment request containing the order identification information and the paying information on the order-placing person, and the payment process unit 3d that executes, based on the payment request, a payment process on the payment information.

Note that such a payment system covers a structure in which the shop server 1 gives the printing command of the print medium (e.g., the payment-procedure sheet) regardless of the process by the payment managing server 3A, and the payment managing server 3A executes the invalidation process on the order identification information regardless of the process by the shop server 1A.

<11. Program and Storage Medium>

As described above, although the shop server 1 has been described as the embodiments of the information processing device according to the present disclosure, a program according to an embodiment is a program (e.g., an application program installed in the user terminal 4) etc., that causes the information processing device (a CPU, etc.,) of the user terminal 4 utilized by the order-placing person to execute various kinds of processes.

The program according to the embodiment causes the arithmetic processing unit of the information processing device (e.g., the user terminal 4) to execute a process of reading, from a print medium, the order identification information (e.g., a two-dimensional bar code) capable of identifying the order.

Moreover, such a program causes the arithmetic processing unit of the information processing device (e.g., the user terminal 4) to execute a process of transmitting the payment request that contains the paying information to make a payment with respect to the order which is placed after the invalidated payment information by the invalidation command and which is not paid yet, and the read order identification information.

That is, this program causes the information processing device (e.g., the user terminal 4) to execute the respective processes from step S501 to step S505 as described with reference to FIG. 7.

One or the plurality of information processing devices as the above-described user terminal 4 can be accomplished by such a program.

Moreover, such a program may be stored in advance in an HDD that is a storage medium built in an apparatus like a computer apparatus, a ROM in a microcomputer that has a CPU, or the like. Alternatively, the program may be temporarily or permanently recorded (stored) in a removable storage medium, such as a semiconductor memory, a memory card, an optical disk, a magneto-optical disc, or a magnetic disk. Furthermore, such a removable storage medium can be provided as a so-called software package.

Still further, such a program may be installed in a personal computer, etc., from the removable storage medium, and also downloadable via a network, such as a LAN or the Internet, from a download site.

REFERENCE SIGNS LIST

1 Shop server
1*a* Information obtaining unit
1*b* Transmitting unit
1*c* Printing control unit
1*d* Invalidation commanding unit
1*e* Receiving unit
3 Payment managing server
3*a* Payment information receiving unit
3*b* Storing process unit
3*c* Payment request receiving unit
3*d* Payment process unit
3*e* Invalidation process unit
4 User terminal

The invention claimed is:

1. A payment system implementing a shop server and a payment managing server, the payment system comprising:
at least one memory configured to store computer program code;
at least one processor configured to access the computer program code and operate as instructed by the computer program code, the computer program code including:
information obtaining code configured to cause the at least one processor to obtain order identification information capable of identifying an order placed by an order-placing person, the order including a first order and an additional order, the first order being placed by the order-placing person, the additional order being placed by the order-placing person in addition to the first order, wherein the shop server is configured to manage preparation of food corresponding to the first order and the additional order, and the order identification information identifies the food, includes a total amount of money and a payment flag, wherein the shop server comprises a first database configured to store the order identification information;
transmitting code configured to cause the at least one processor to transmit, as payment information, the order identification information, first information indicating that the order is the additional order and amount information, wherein the payment managing server comprises a second database, and the payment managing server is configured to manage a payment, and the payment managing server is further configured to receive the order identification information and store, in the second database, the order identification information, the amount information, the first information indicating that the order is the additional order, a validation flag and an already-paid flag;
printing control code configured to cause the at least one processor to cause a printing process of a print medium to be executed, the print medium being capable of identifying the order identification information;
invalidation commanding code configured to cause the at least one processor to give an invalidation command to the payment managing server when the additional order is received, the invalidation command invalidating the order identification information on the first order which is not paid yet in such a way that the payment with respect to the order identification information on the first order which is not paid yet is disabled, wherein the invalidation command is automatically generated by the shop server based on a determination that the first order is not yet paid, and wherein the invalidation command is not caused by the order-placing person;
payment information receiving code configured to cause the at least one processor to receive the payment information;
storing process code configured to cause the at least one processor to cause a storing process of the payment information to be executed;
payment request receiving code configured to cause the at least one processor to receive a payment request from an order-placing person terminal utilized by the order-placing person, the payment request containing the order identification information and paying information on the order-placing person;
payment process code configured to cause the at least one processor to execute, based on the payment request, a payment process on the payment information; and
invalidation process code configured to cause the at least one processor to receive the invalidation command of the invalidation commanding code, and to invalidate the payment information, wherein the payment managing server performs an invalidation process based on the payment information stored in the second database.

2. A payment system implementing a shop server and a payment managing server, the payment system comprising:

at least one memory configured to store computer program code;

at least one processor configured to access the computer program code and operate as instructed by the computer program code, the computer program code including:

information obtaining code configured to cause the at least one processor to obtain order identification information capable of identifying an order placed by an order-placing person, the order including a first order and an additional order, the first order being placed by the order-placing person, the additional order being placed by the order-placing person in addition to the first order, wherein the shop server is configured to manage preparation of food corresponding to the first order and the additional order, and the order identification information identifies the food, includes a total amount of money and a payment flag, wherein the shop server comprises a first database configured to store the order identification information;

transmitting code configured to cause the at least one processor to transmit, as payment information, the order identification information, first information indicating that the order is the additional order and amount information, wherein the payment managing server comprises a second database, and the payment managing server is configured to manage a payment, and the payment managing server is further configured to receive the order identification information and store, in the second database, the order identification information, the amount information, the first information indicating that the order is the additional order, a validation flag and an already-paid flag;

payment information receiving code configured to cause the at least one processor to receive the payment information;

storing process code configured to cause the at least one processor to cause a storing process of the payment information to be executed;

printing control code configured to cause the at least one processor to cause a printing process of a print medium to be executed, the print medium being capable of identifying the order identification information;

invalidation process code configured to cause the at least one processor to execute, when the additional order is received, an invalidation process of invalidating, using an invalidation command, the order identification information on the first order which is not paid yet in such a way that the payment with respect to the order identification information on the first order which is not paid yet is disabled, wherein the invalidation command is automatically generated by the shop server based on a determination that the first order is not yet paid, and wherein the invalidation command is not caused by the order-placing person, wherein the payment managing server performs the invalidation process based on the payment information that has been stored in the second database;

payment request receiving code configured to cause the at least one processor to receive a payment request from an order-placing person terminal utilized by the order-placing person, the payment request containing the order identification information and paying information on the order-placing person; and payment process code configured to cause the at least one processor to execute, based on the payment request, a payment process on the payment information.

* * * * *